US012226004B2

(12) United States Patent
Pinkos et al.

(10) Patent No.: US 12,226,004 B2
(45) Date of Patent: Feb. 18, 2025

(54) COMMUNICATIONS POUCH

(71) Applicant: Vorbeck Materials Corp., Jessup, MD (US)

(72) Inventors: Jennifer Pinkos, Hanover, MD (US); Keren Espina, Randallstown, MD (US); James Turney, Silver Spring, MD (US); Can Gun Yaprak, Halethorpe, MD (US); Christie Burrow, New Market, MD (US)

(*) Notice: Subject to any disclaimer, the term of this patent is extended or adjusted under 35 U.S.C. 154(b) by 0 days.

(21) Appl. No.: 17/696,562

(22) Filed: Mar. 16, 2022

(65) Prior Publication Data

US 2023/0292913 A1 Sep. 21, 2023

(51) Int. Cl.

| | |
|---|---|
| ***A45F 3/02*** | (2006.01) |
| ***H01Q 1/27*** | (2006.01) |
| ***H01Q 1/52*** | (2006.01) |
| *A45F 3/00* | (2006.01) |

(52) U.S. Cl.
CPC ............... *A45F 3/02* (2013.01); *H01Q 1/273* (2013.01); *H01Q 1/526* (2013.01); *A45F 2003/003* (2013.01)

(58) Field of Classification Search
CPC ..... A45F 3/02; A45F 2003/003; H01Q 1/273; H01Q 1/526
USPC .......................................................... 224/576
See application file for complete search history.

(56) References Cited

U.S. PATENT DOCUMENTS

| | | | | | |
|---|---|---|---|---|---|
| 5,093,929 | A * | 3/1992 | Stolarczyk | H04B 5/0081 | 455/100 |
| 5,146,611 | A * | 9/1992 | Stolarczyk | H04B 5/02 | 455/40 |
| 7,658,901 | B2 * | 2/2010 | Prud'Homme | H05K 1/095 | 423/448 |
| 8,278,757 | B2 * | 10/2012 | Crain | H05K 3/0091 | 977/734 |
| 10,601,104 | B2 * | 3/2020 | Manivannan | H01Q 1/38 | |
| 11,265,410 | B2 * | 3/2022 | Scheffer | H04B 1/385 | |
| 11,722,592 | B2 * | 8/2023 | Pinkos | H01Q 1/273 | 455/702 |
| 2002/0089458 | A1 * | 7/2002 | Allen | H01Q 1/273 | 343/718 |

(Continued)

*Primary Examiner* — Peter N Helvey
(74) *Attorney, Agent, or Firm* — Trent V. Bolar, Esq.; Woods Oviatt Gilman LLP

(57) ABSTRACT

Various wearable communications pouches ("WCP") having modular and static antenna elements of reduced visual signature are provided. The WCP demountably couples to the shoulder straps of articles, garments, and baggage items. The WCP includes a front panel and shoulder strap(s) pivotably coupled to opposite sides of a back panel. The back panel includes a communications hub that has antenna ports that are each conductively coupled to an antenna element or antenna attachment site. Each antenna attachment site receives a demountable antenna element. The antenna element and demountable antenna element include a conductive composition that includes a polymer and graphene sheets present as a percolated network therein. The back panel includes a fastener positioned proximate to the hub that receives and secures a portable radio. The front panel, back panel, and shoulder strap each include a RF shielding material to shield the user from RF radiation that emanates from the WCP.

20 Claims, 25 Drawing Sheets

(56) References Cited

U.S. PATENT DOCUMENTS

| | | | | |
|---|---|---|---|---|
| 2006/0143775 | A1* | 7/2006 | Kim | A41D 1/005 2/102 |
| 2018/0109277 | A1* | 4/2018 | Ooi | A45F 3/14 |
| 2019/0132948 | A1* | 5/2019 | Longinotti-Buitoni | A61B 5/6805 |
| 2019/0238613 | A1* | 8/2019 | Tofighbakhsh | H04W 24/02 |
| 2019/0268550 | A1* | 8/2019 | Arnold | A42B 3/042 |
| 2020/0002560 | A1* | 1/2020 | Lai | C09D 11/037 |
| 2020/0214414 | A1* | 7/2020 | Caldwell | A45C 13/02 |
| 2020/0395970 | A1* | 12/2020 | Manivannan | A41D 1/002 |

* cited by examiner

COMMUNICATIONS POUCH

STATEMENT REGARDING FEDERALLY SPONSORED RESEARCH OR DEVELOPMENT

This invention was made with government support under a project level agreement with the Air Force Research Laboratory, Number Project Announcement No. RIK-OTA-20-GWA. The U.S. Government has certain rights in this invention.

TECHNICAL FIELD

The instant disclosure relates generally to communications systems and specifically to wearable communication pouches.

BACKGROUND

Hand-held (i.e. portable) communications systems, such as walkie-talkies and other portable radio transceivers, are typically used by military personnel, law enforcement officials, first responders, as well as civilians. However, such systems typically utilize one or more conspicuous antennas, such as whip antennas, which typically consist of a straight flexible metal wire or rod. The bottom end of whip antennas are coupled to the radio receiver, transmitter, or transceiver. Whip antennas are typically designed to be flexible to reduce breaking. However, such antennas are increasingly deployed in environments where identification of communications personnel and/or their locations may not be desired (e.g., military theaters and clandestine operations). Even more, such antennas are typically vulnerable to entanglement in foliage or debris, and damage in disaster and emergency, as well as high population density environments. Therefore, a communications solution that does not require whip antennas will be beneficial to consumers.

DETAILED DESCRIPTION

Figure 1:
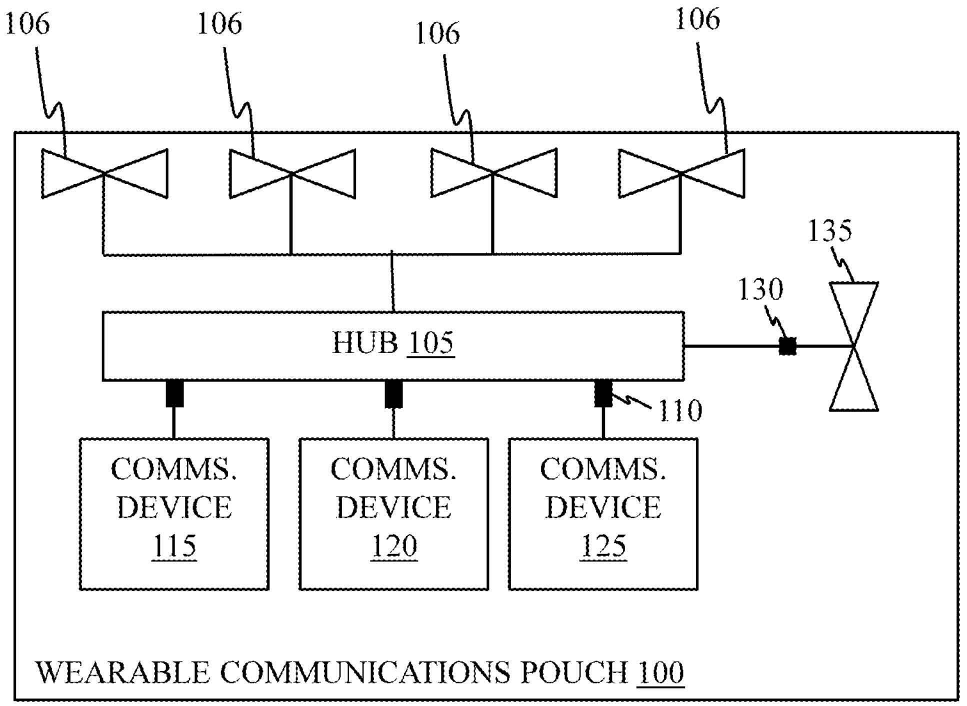
FIG. 1 is a block diagram illustrating a wearable communications pouch (hereinafter "WCP"), in accordance with some embodiments.

The descriptions of the various embodiments of the instant disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terminology may be employed in the following description for convenience rather than for any limiting purpose. For example, the terms "forward" and "rearward," "front" and "rear," "right" and "left," "upper" and "lower," "up" and "bottom," and "top" and "bottom" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense. Similarly, the terms "a" and "an" are construed to mean "at least one" or "one or more" etc. The term "distal" refers to items or components that are situated away from a point of reference (i.e., the opposite of proximate). The term "proximate" refers to items or components that are situated near a point of reference (i.e., the opposite of distal). The term "dynamically positionable" antennas elements refers to antenna elements that can be demountably coupled to the pouch at two or more different positions thereon (i.e., interchangeable, swappable, fungible).

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context.

Hand-held (i.e. portable) communications systems, such as walkie-talkies and other portable radio transceivers (hereinafter "portable radios"), are typically used by military personnel, law enforcement officials, first responders, as well as civilians. However, such systems typically utilize one or more conspicuous antennas, such as whip antennas, which typically consist of a straight flexible metal wire or rod. The bottom end of whip antennas are conductively coupled to the communications systems (i.e., radio receiver, transmitter, or transceiver). Whip antennas are typically designed to be flexible to reduce breaking. However, such antennas are increasingly deployed in environments where identification of the communications personnel and/or their locations may not be desired (e.g., military theaters and clandestine operations). Even more, such antennas are typically vulnerable to entanglement in foliage or debris, and damage in disaster and emergency, as well as high population density environments.

Embodiments of the instant disclosure seek to provide wearable communications pouches that employ antenna elements having a reduced visual signature. Other aspects of the instant disclosure seek to provide wearable communications pouches that demountably couple to articles of clothing, garment items, and baggage items (e.g., armor plate carriers, backpacks, as well as similar garment items and baggage items). Additional aspects of the instant disclosure seek to provide wearable communications pouches that include modular antennas elements that are dynamically positionable (i.e., swappable, switchable, etc.).

FIGS. 1-24 illustrate various views of a communication pouch that can be worn on the person of a user ("wearable communications pouch" or WCP) via shoulder straps, according to some embodiments. FIG. 1 is a block diagram of the WCP 100, according to certain embodiments. The WCP 100 includes a communications hub 105, one or more antenna elements 106, and one or more communications devices (e.g., communication devices 115, 120, and 125). For example, each copy of the antenna element 106 can have the same or different operating frequencies compared to other copies of antenna elements 106. The communications hub 105 is the central location where portable radios (e.g., communication devices 115, 120, and 125) or other similar electronic devices with a radio-frequency ("RF") connection conductively attach to the WCP 100. In other words, the communications hub 105 acts as a RF bulkhead. For example, the communications hub 105 includes antenna ports 110 that are each conductively coupled to one or more of the antenna elements 106. Each antenna port 110 further conductively couples to a portable radio (e.g., the communications devices 115, 120, or 125). The communications hub 105 can be fabricated using any material that supports one or more embodiments described herein (e.g., metals and/or plastics) and can include any number of the antenna ports 110.

Additional antenna elements 106 can be attached to the WCP 100 to change the RF radiation pattern of the WCP 100. For example, the antenna elements 106 having a particular operational frequency (e.g., frequency A) can be exchanged with other antenna elements 106 having a different operational frequency (e.g., frequency B). The fungibility of the antenna elements 106 allows the WCP 100 to generate or alter RF frequency coverage and RF radiation patterns thereof to meet individual needs, inclinations, and/or specifications. In addition, the quantity of the antenna elements 106 included in the WCP 100 can be varied according to user requirements. In certain embodiments, the WCP 100 includes at least one antenna attachment site 130 which receives a demountable antenna element 135. The demountable antenna elements 135 preferably "snap" on to the antenna attachment sites 130 (i.e., are demountably attached).

In other words, the demountable antenna elements 135 and the antenna attachment sites 130 demountably couple together when shifted in a common plane, which thereby forms a selective, intermitting, and conductive coupling therebetween. The communications devices 115, 120, and 125 can be any hand-held communications device known in the art, such as walkie-talkies and other portable radio transceivers that are typically used by military personnel, law enforcement officials, first responders, as well as civilians. In some embodiments, the communications devices 115, 120, and 125 operate on different operating frequencies. The antenna ports 110 can be any RF connector known in the art that supports one or more embodiments of the instant disclosure (e.g., SMA QMA, BNC, etc.).

For example, the communications devices 115, 120, and 125 include similar components having similar connectivities and functionalities. In still other embodiments, the hub 130 can is conductively coupled to antenna elements 140. The communications devices 110, 120, 125 are a portable communications device that send and/or receive radio transmissions with other communications devices. One or more of the communications device 110, 120, and 125 can be a plurality of devices interoperably connected to perform one or more functions, steps, and/or processes of a communications device known in the art.

In several embodiments, the communications devices 110, 120, and/or 125 send and/or receive data modulated via one or more communications protocols known in the art. For example, applicable communication protocols can include, but are not limited to, UHF, VHF, Long-Term Evolution ("LTE"), 3G, standards based on GSM/EDGE and/or UMTS/HSPA, Wi-Fi, IEEE 802.11 standards, GPSR, local area networking protocols, wide area networking protocols, Bluetooth, microwave, similar wireless communications protocols, or a combination of two or more thereof.

In certain embodiments, the communications devices 110, 120, 125 each operate on a unique radio frequency range. For example, the communications devices 110, 120, 125 may be configured to operate on the VHF (i.e. 30-300 MHz), UHF (i.e. 300 MHz to 3 GHz), GPSR radio frequency bands, respectively, and thereby allow the WCP 100 to exhibit multi-band/broadband functionality (discussed further below). The antenna ports 110 can include a fastening mechanism known in the art (e.g., thread, bayonet, braces, blind mate, etc.) and springs for a low ohmic electric contact while sparing the conductive surface, thus allowing very high mating cycles and reducing the insertion force.

Turning now to FIGS. 2-19, which illustrate a WCP 101. The WCP 101 includes one or more aspects, components, and/or functionality of the WCP 100. In other words, the WCP 101 is a type of (e.g., an embodiment of) WCP 100. FIGS. 2-5 illustrate the WCP 101 in a "first closed state," in accordance with certain embodiments. The WCP 101 preferably includes a front panel 200, a back panel 205, and a plurality of shoulder straps 210. The aforementioned components of the WCP 101 are preferably formed using fabric materials (e.g., Cardura, mesh, neoprene, spacer mesh, canvas, leather, cotton, plastic, Kevlar, denim, duck cloth, or a combination of two or more thereof) that can be coated with a waterproofing material. Although not shown, the WCP 101 can include one shoulder strap 210 or none thereof. In embodiments that do not include the shoulder straps 210, the WCP 101 demountably attaches to garment or baggage items using a demountable fastener (discussed below). The front panel 200 preferably includes the antenna elements 106 positioned therein.

The WCP 101 preferably shields the user's body from at least a portion of the RF signals that emanate therefrom, which reduces RF interference and improves signal quality. As illustrated in FIG. 7B, the WCP 101 includes multilayered components that have RF shielding material inserted between the fabric layers, in accordance with other embodiments. To be sure, at least one of the front panel 200, the back panel 205, and the shoulder strap 210 is a multilayered component that includes RF shielding material. For example, the WCP 101 can include a multilayered component 735 that includes a fabric layer 715, the antenna element 106, a RF shielding layer 720, and a fabric layer 725, which is positioned proximate to a user 730 when the WCP 101 is worn.

Here, the antenna element 106 is positioned between the fabric layer 715 and the RF shielding layer 720. The RF shielding layer 720 is positioned between the antenna element 106 and the fabric layer 725. The RF shielding layer 720 reflects RF signals that emanate from the antenna element 106 towards the fabric layer 715 and thereby shield the user 730 from the offensive RF signals. Applicable RF shielding material includes, but is not limited to, RF shielding meshes, coatings, textiles, and foams (e.g., quarter inch closed-cell polypropylene foam). The RF shielding material 720 preferably physically separates antenna elements from user's body to reduce RF interference and improve signal quality. Although not shown, the multilayered component 735 can include additional or less layers that those depicted. For example, components of the WCP 101 that have antenna attachment sites 130 can also include the RF shielding layer 720 positioned thereunder and proximate thereto throughout at least a portion of the multilayered component 735. Even if the antenna element 106 or the antenna attachment site 130 is not present (e.g., as in the back panel 205), the multilayered component 735 can include the RF shielding layer 720 to provide additional RF shielding.

For example, the RF shielding material 720 can also be lined with and/or include conductive material, such as aluminum or copper foil, or material coated with (or combined with) graphene, silver, copper conductive ink, to provide additional RF isolation and RF shielding from the user 730 to reduce the specific absorption rate of the WCP 101. As such, the RF shielding layer 720 reflects RF radiation that emanates from the antenna element 106 away from the user 730 body. The back panel 205 is pivotably coupled to the front panel 200. The front panel 200 is positioned proximate to the back panel 205 in the "first closed state" and thereby covers the communications hub 105. In other words, the front panel 200 overlaps (i.e., covers) the back panel 205 when the WCP 101 is oriented in the "first closed state."

The front panel 200 and the back panel 205 are preferably laterally and demountable coupled together via at least one second demountable fasteners 220 to further secure the communications devices 115, 120, and 125 as well as any of the demountable antenna elements 135 that are attached to antenna attachment sites 130 to protect them possible environmental hazards. Although, the second demountable fasteners 220 are depicted as buckles, they can be any demountable fastener known in the art that facilitates one or more embodiments of the instant disclosure. The back panel 205 can include an envelope 515 positioned opposite the communications hub 110 (i.e., positioned on opposing surfaces of the back panel 205). In certain embodiments, the WCP 101 attaches to garment items having shoulder straps, which include, but are not limited to, armor plate carriers and back packs. The WCP 101 can include a third demountable fastener 510 that is, for example, vertically positioned and affixed thereto. The third demountable fastener 510 is positioned opposite the communications hub 105 (i.e., on opposing surfaces). Although the third demountable fastener 510 is depicted as a zipper, the component can be any demountable fastener that allows the WCP 101 to demountably attach to garment items that are, for example, at least partially worn on the upper torso, in accordance with yet still other embodiments.

In preferred embodiments, each shoulder strap 210 is pivotably coupled to and extends from the back panel 205. Alternatively, the shoulder strap 210 can be pivotably coupled to extend from front panel 200. In certain embodiments, one or more of the shoulder straps 210 each includes an antenna attachment site 130 that receives a demountable antenna element 135. The demountable antenna element 135 is preferably fabricated using a conductive composition (discussed below). FIG. 7C depicts a pairing element 740 complementarily and demountably mating with the antenna attachment site 130, in accordance with some embodiments. The demountable antenna element 135 includes and is conductively coupled to the pairing element 740. The pairing element 740 and the antenna attachment site 130 are complementing components of a mating system (i.e., they complementarily mate together when joined). The pairing element 740 complementarily and demountably mates with the antenna attachment site 135 when the two are brought together and thereby form the aforementioned mating system. When coupled together, the pairing element 740 and the antenna attachment site 130 facilitate RF wave propagation between the communications hub 105 and the demountable antenna element 135.

In some aspects, the communications hub 105 is conductively coupled to each antenna attachment site 130 via a transmission line 750. The transmission line 750, for example, may be affixed to one or more internal and/or external surfaces of the WCP 100. In other aspects, the pairing element 740 and the antenna attachment site 130 demountably engage each other when shifted in a common plane, which thereby forms a selective, intermitting, and conductive coupling therebetween. In still other aspects, the pairing element 740 and the antenna attachment site 130 form a conductive hook-and-loop mating system when engaged. For example, individual hooks and loops can be formed using the conductive composition (discussed below) and applicable formation techniques known in the art.

Figure 2:
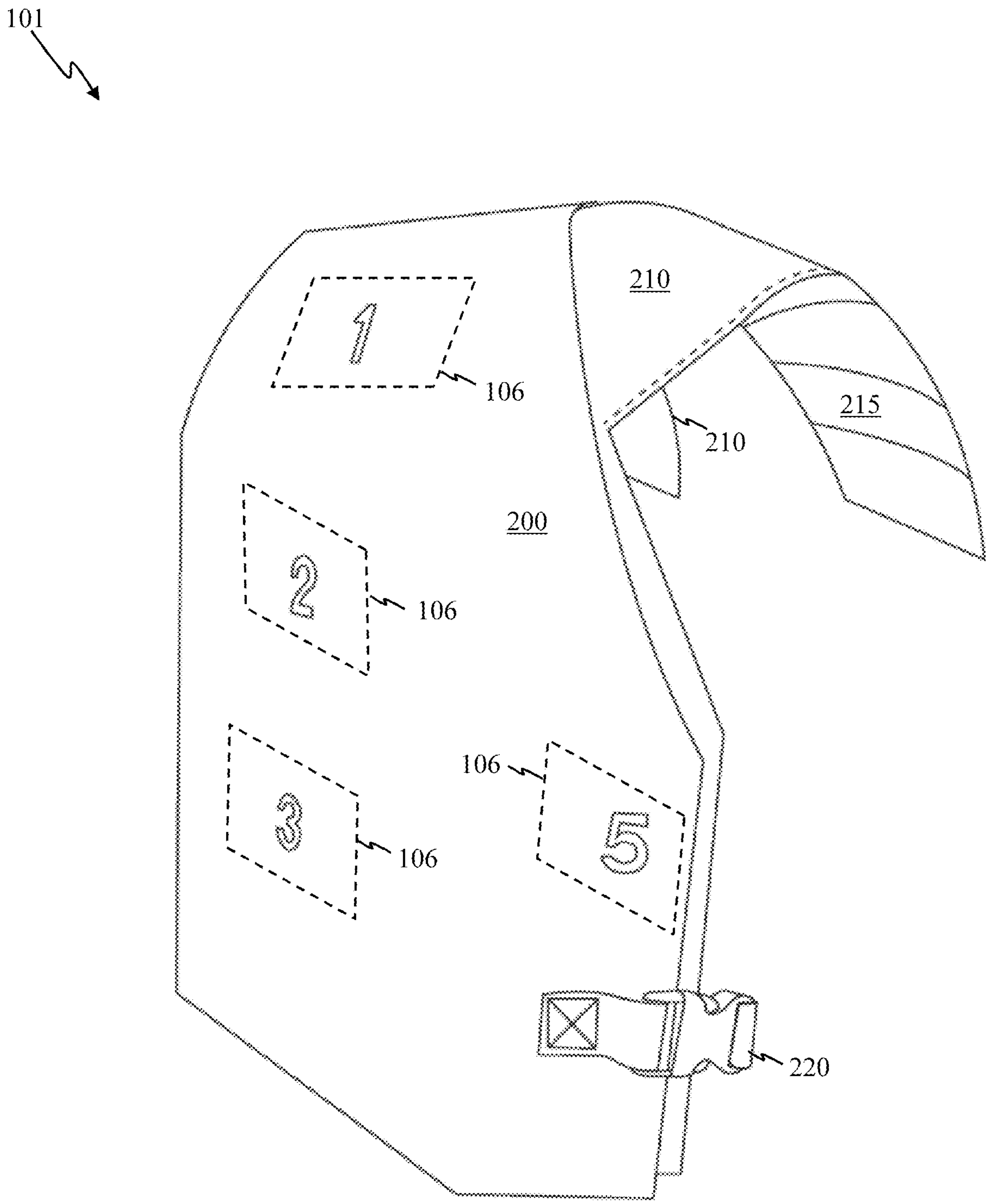
FIG. 2 illustrates a right perspective view of the WCP in a "first closed state", in accordance with other embodiments.
Figure 3:
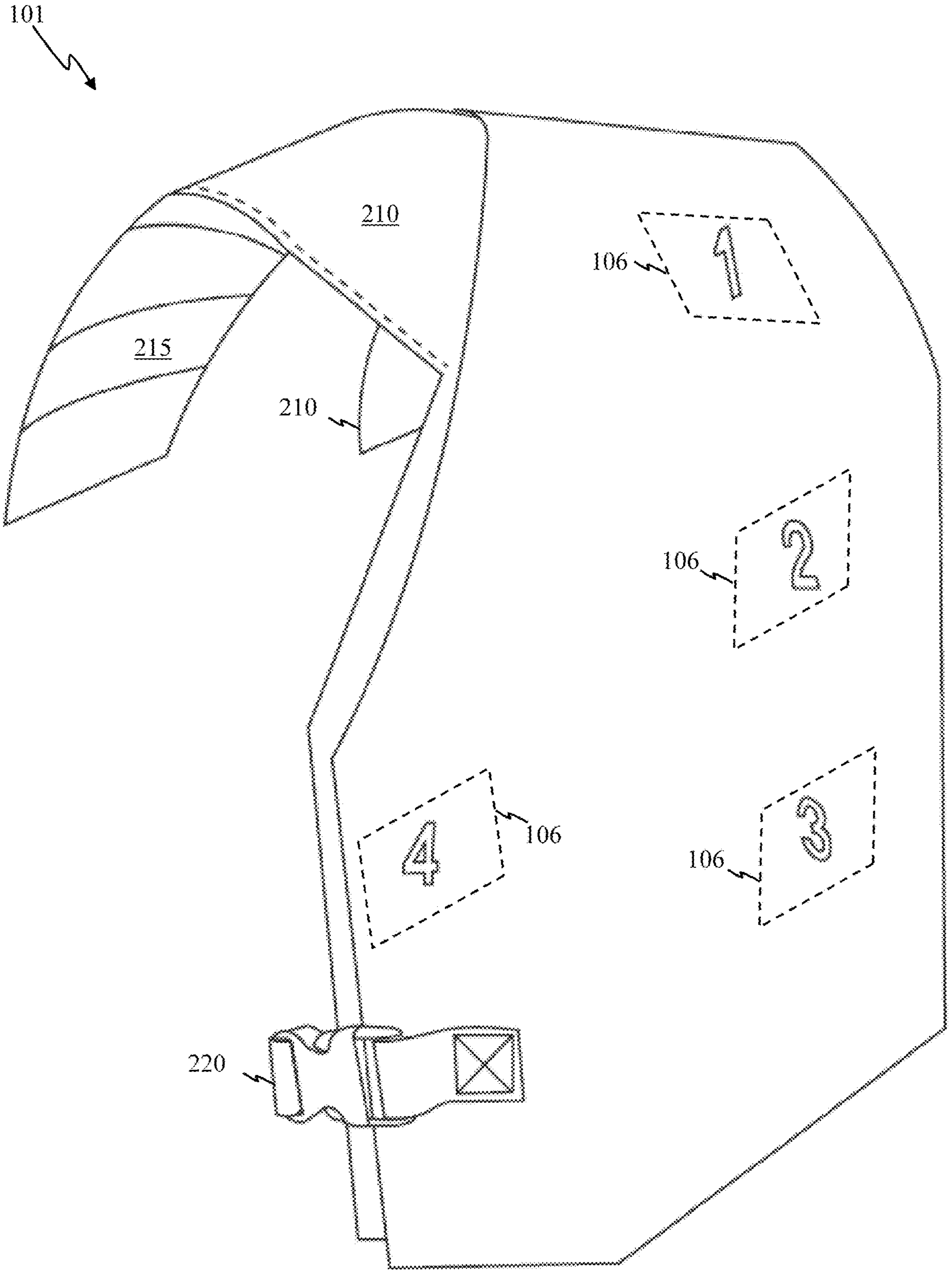
FIG. 3 illustrates a left perspective view of the WCP in the "first closed state", in accordance with certain embodiments.
Figure 4:
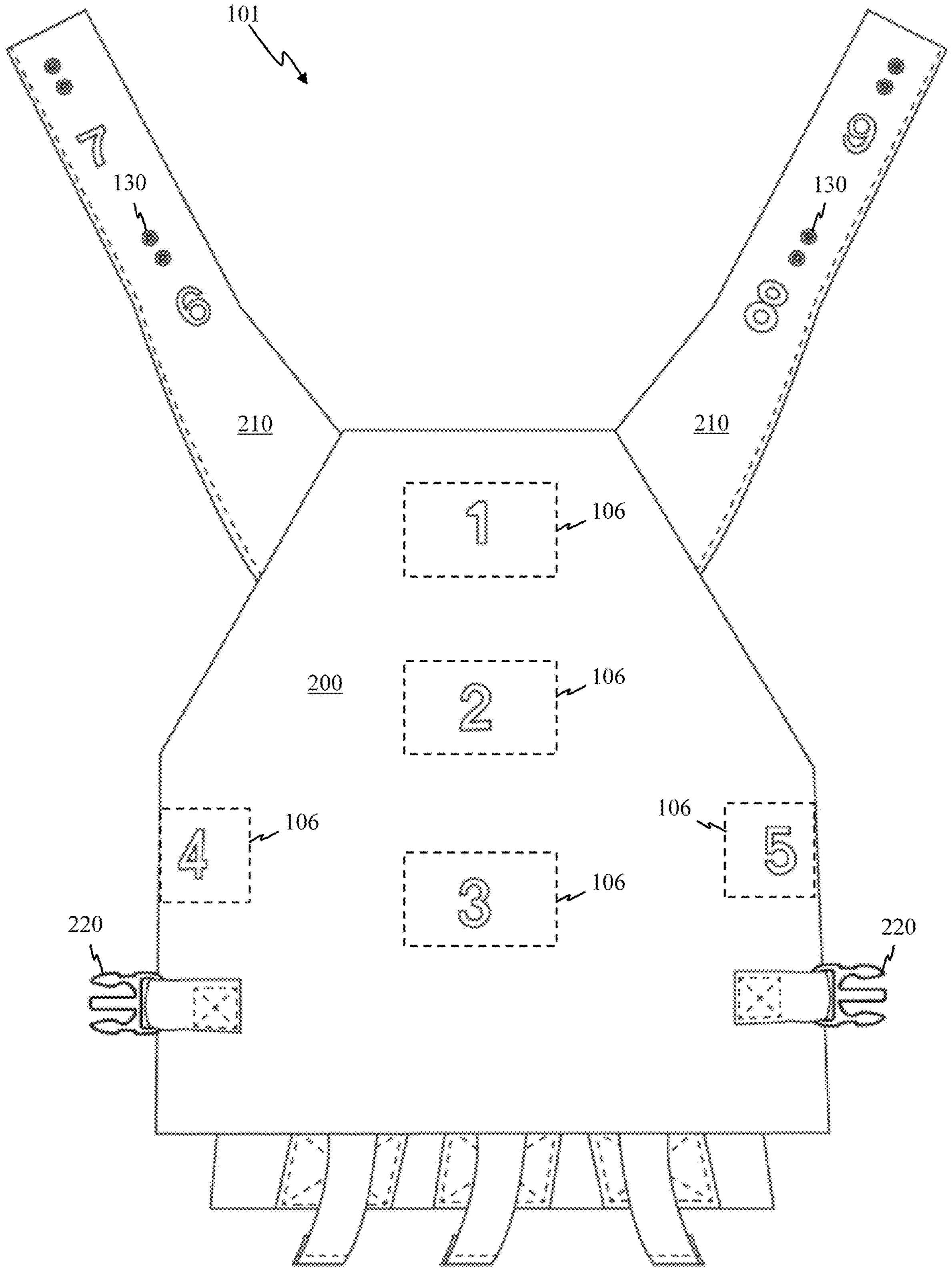
FIG. 4 illustrates a front view of the WCP in the "first closed state", in accordance with yet still others embodiments.
Figure 5:
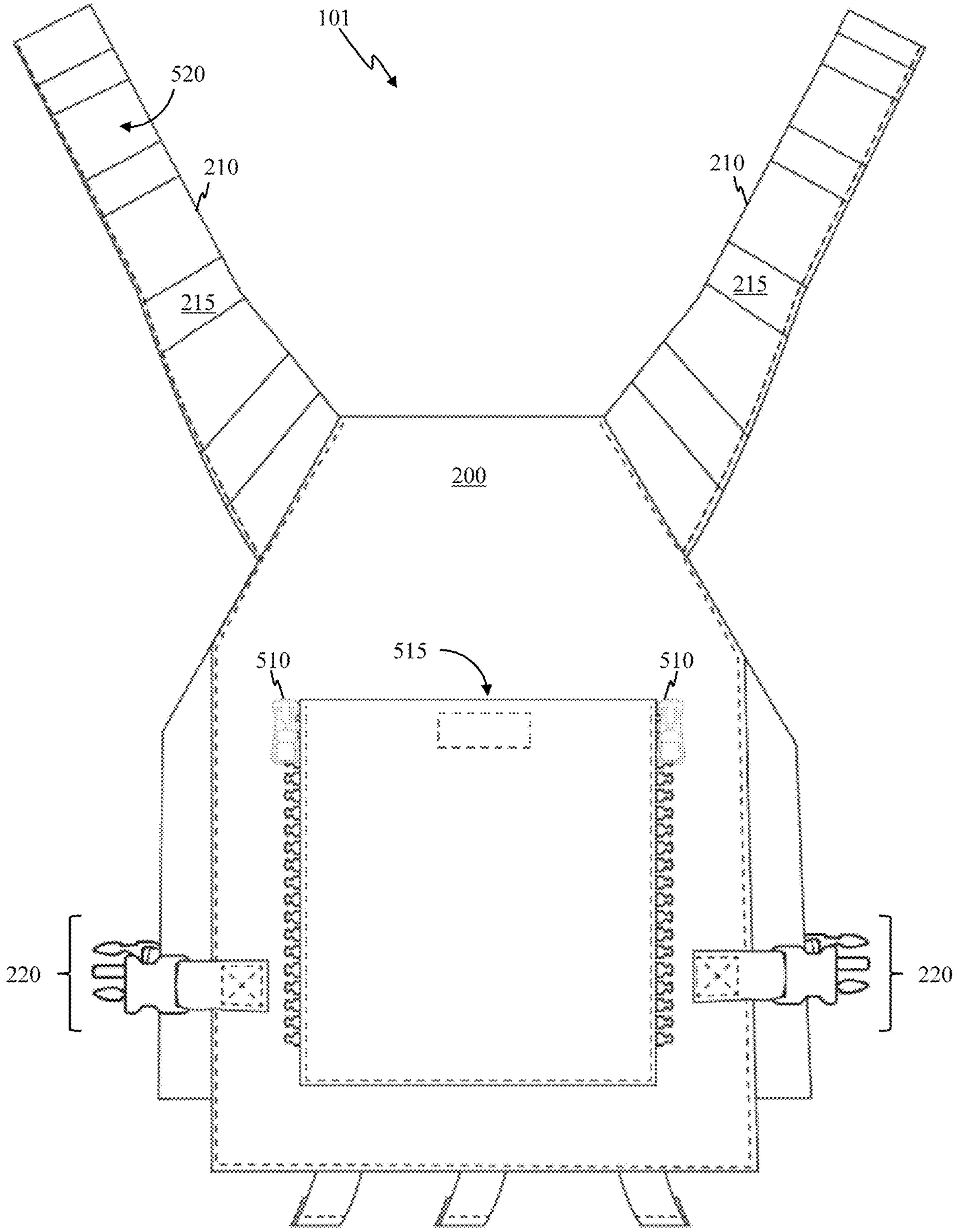
FIG. 5 illustrates a back view of the WCP in the "first closed state", in accordance with some embodiments.
Figure 7A:
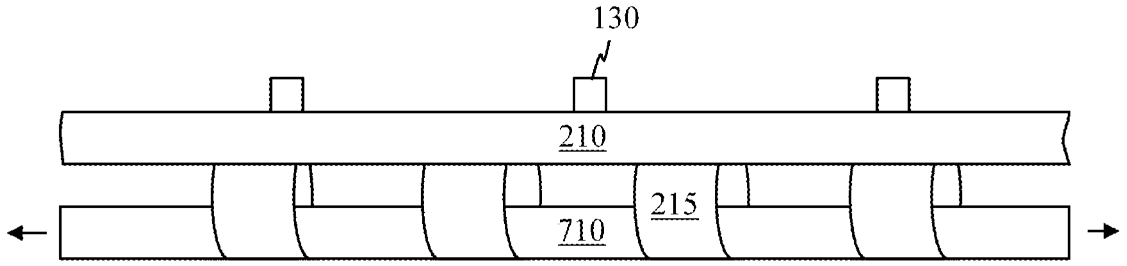
FIG. 7A depicts a side view of a shoulder strap having loops that receive a garment shoulder strap, in accordance with other certain embodiments.
Figure 7B:
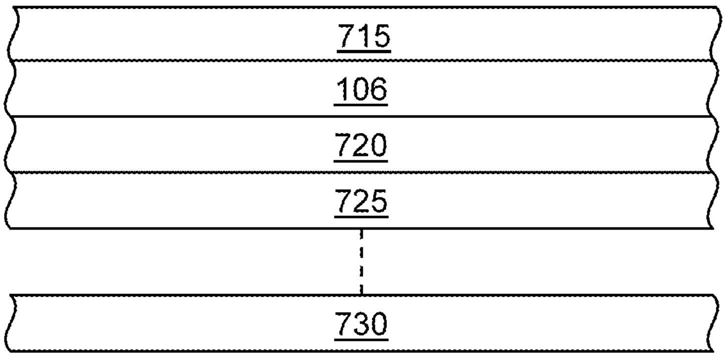
FIG. 7B depicts a side view of a multilayered component positioned proximate to a user, in accordance with some embodiments.
Figure 7C:
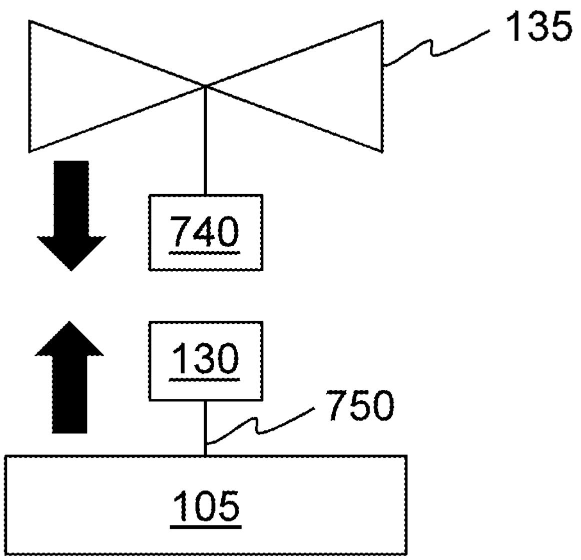
FIG. 7C depicts a pairing element demountably engaging an antenna attachment site, in accordance with an embodiment.
Figure 8:
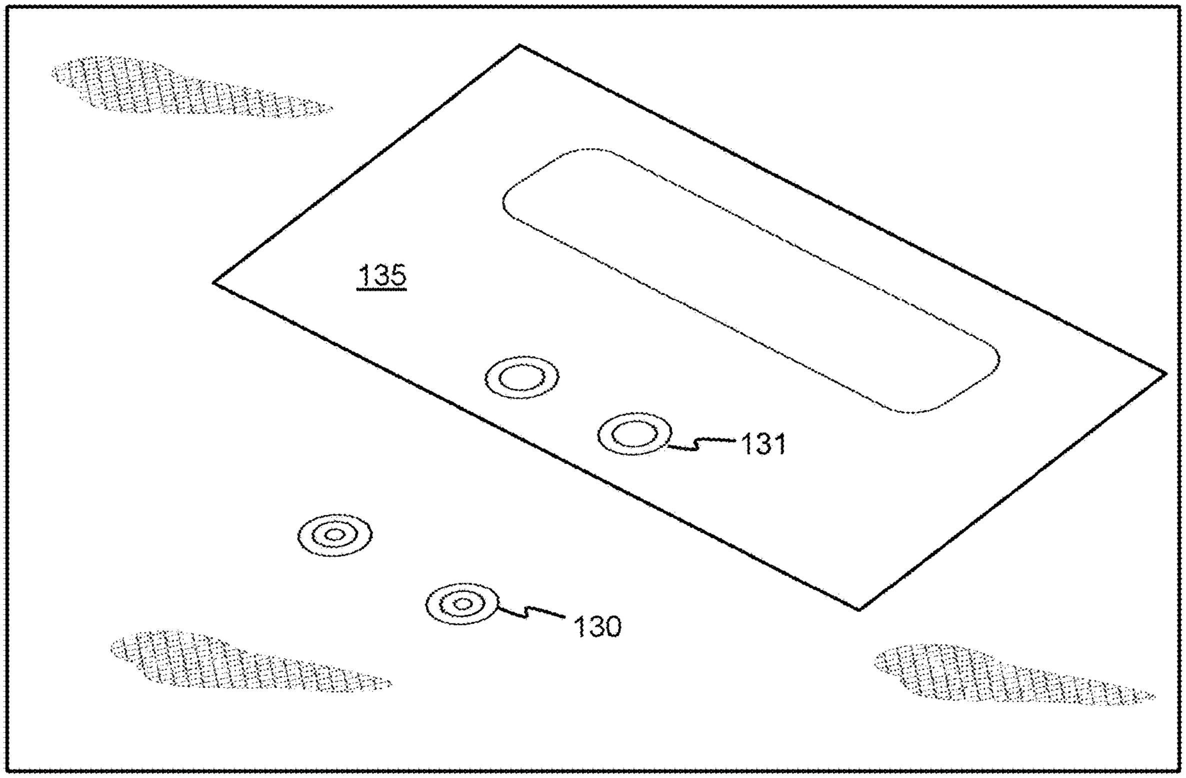
FIG. 8 illustrates an antenna attachment site and an antenna element that demountably couples to the antenna attachment site, in accordance with certain embodiments.
Figure 9:
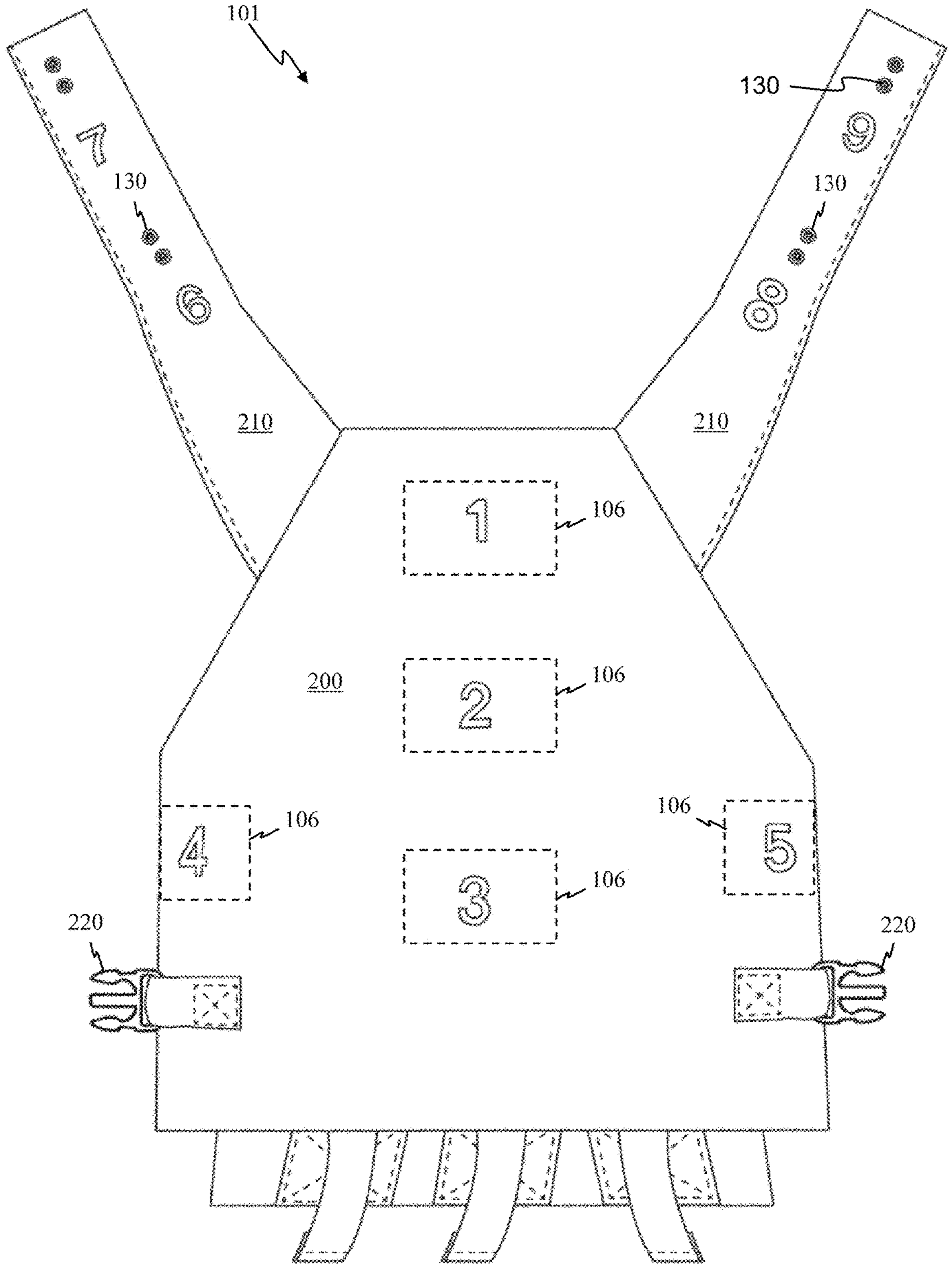
FIG. 9 is a photograph of a front view of the WCP in a "first closed state", in accordance with yet still others embodiments.
Figure 10:
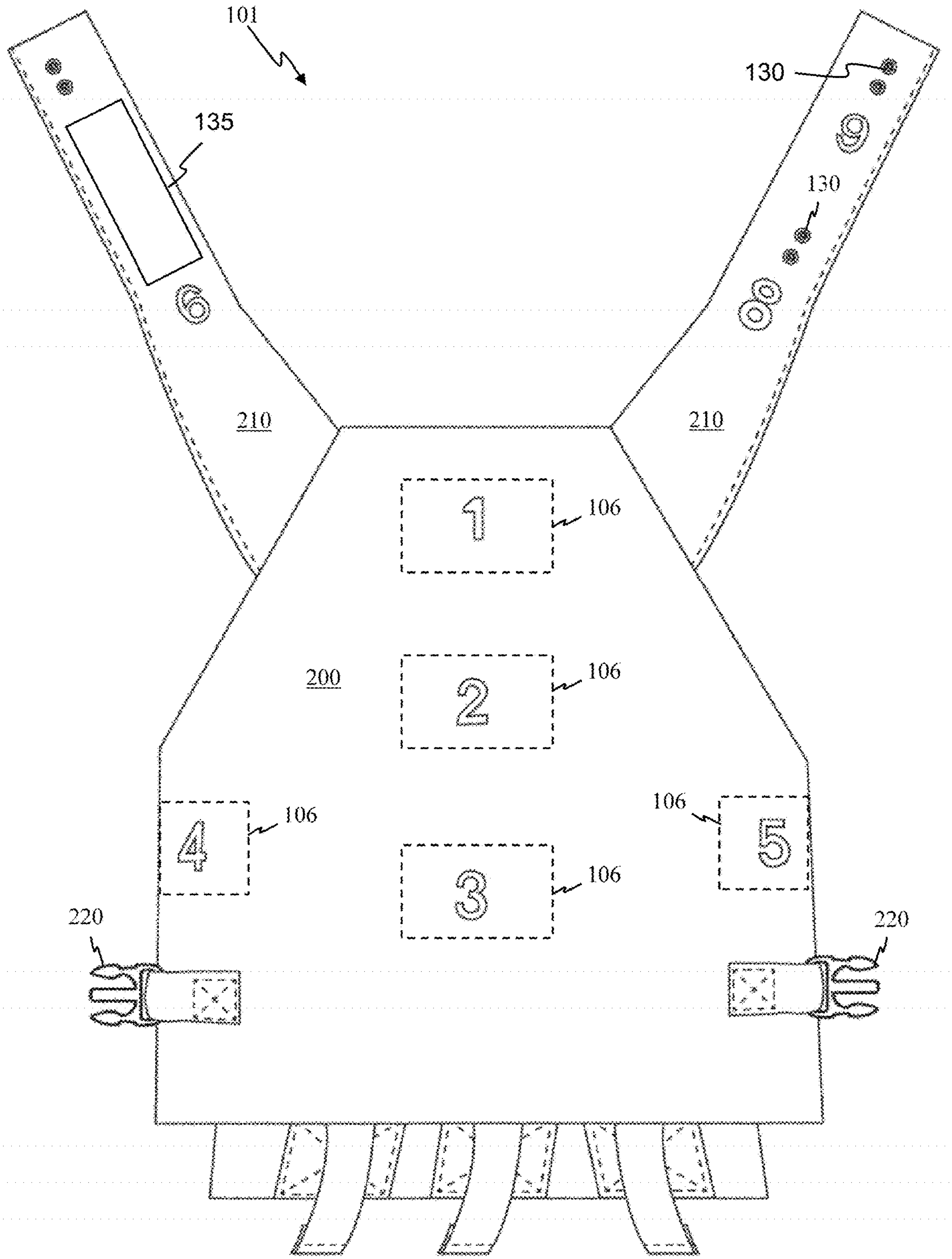
FIG. 10 is a photograph of a front view of the WCP in a "first closed state" having an demountable antenna element demountably attached to an antenna attachment site on its first shoulder strap, in accordance with yet still others embodiments.
Figure 11:
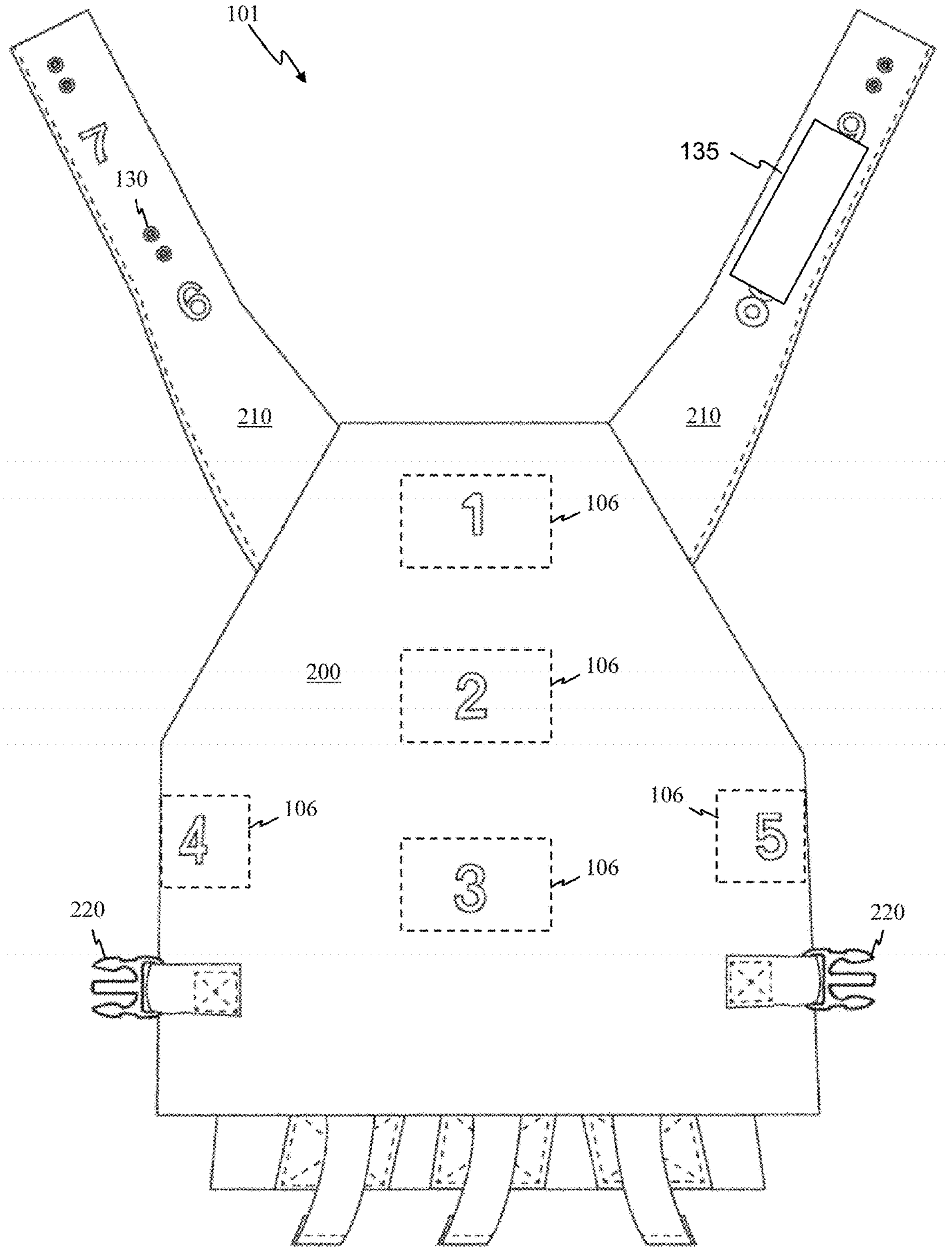
FIG. 11 is a photograph of a front view of the WCP in a "first closed state" having an demountable antenna element demountably attached to an antenna attachment site on its second shoulder strap, in accordance with yet still others embodiments.
Figure 12:
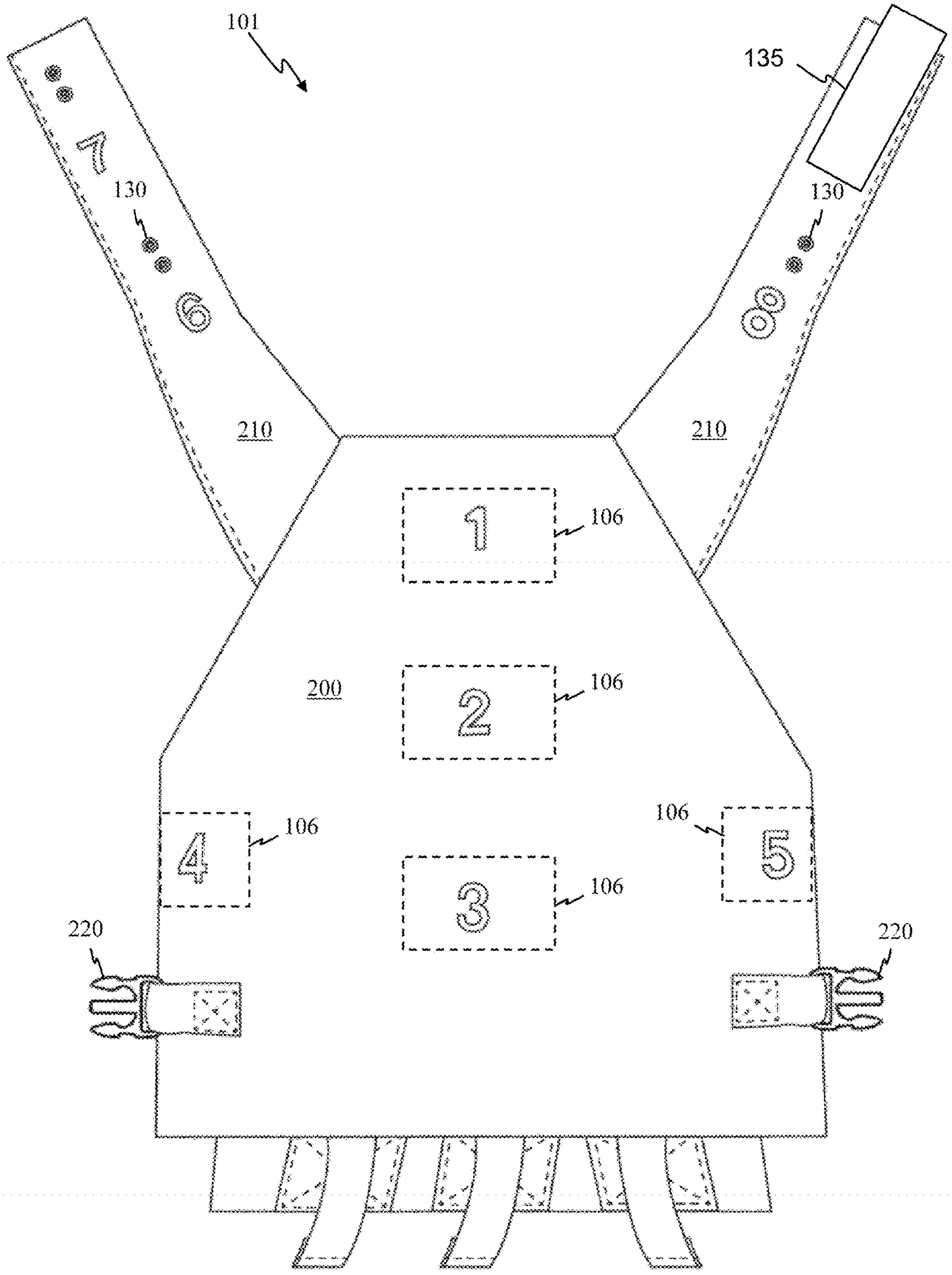
FIG. 12 is a photograph of a front view of the WCP in a "first closed state" having an demountable antenna element demountably attached to an antenna attachment site on its second shoulder strap at an alternative location compared to FIG. 11, in accordance with some embodiments.
Figure 13:
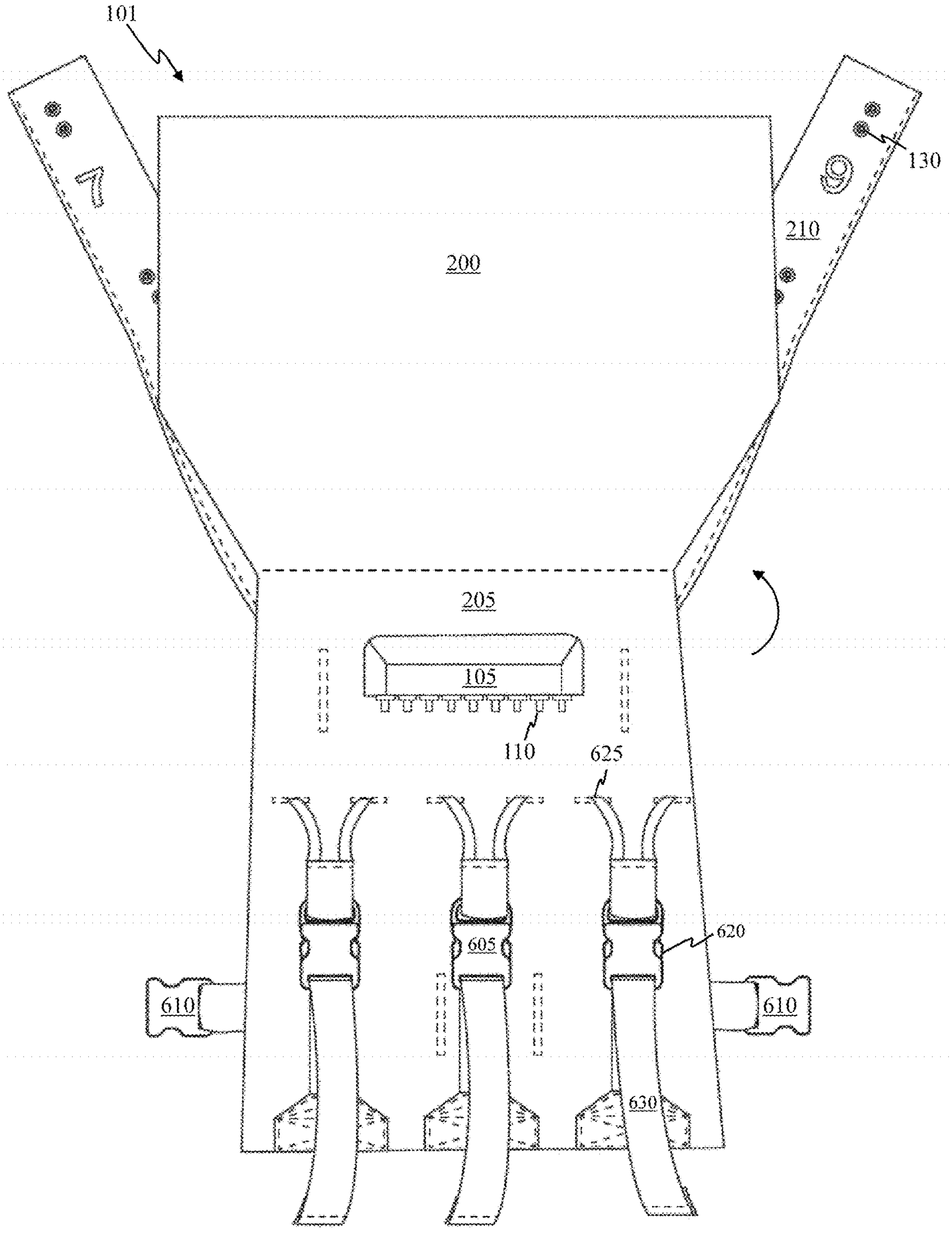
FIG. 13 is a photograph of a front view of the WCP in a "first open state" exposing its communications hub and demountable fasteners, in accordance with other embodiments.
Figure 14:
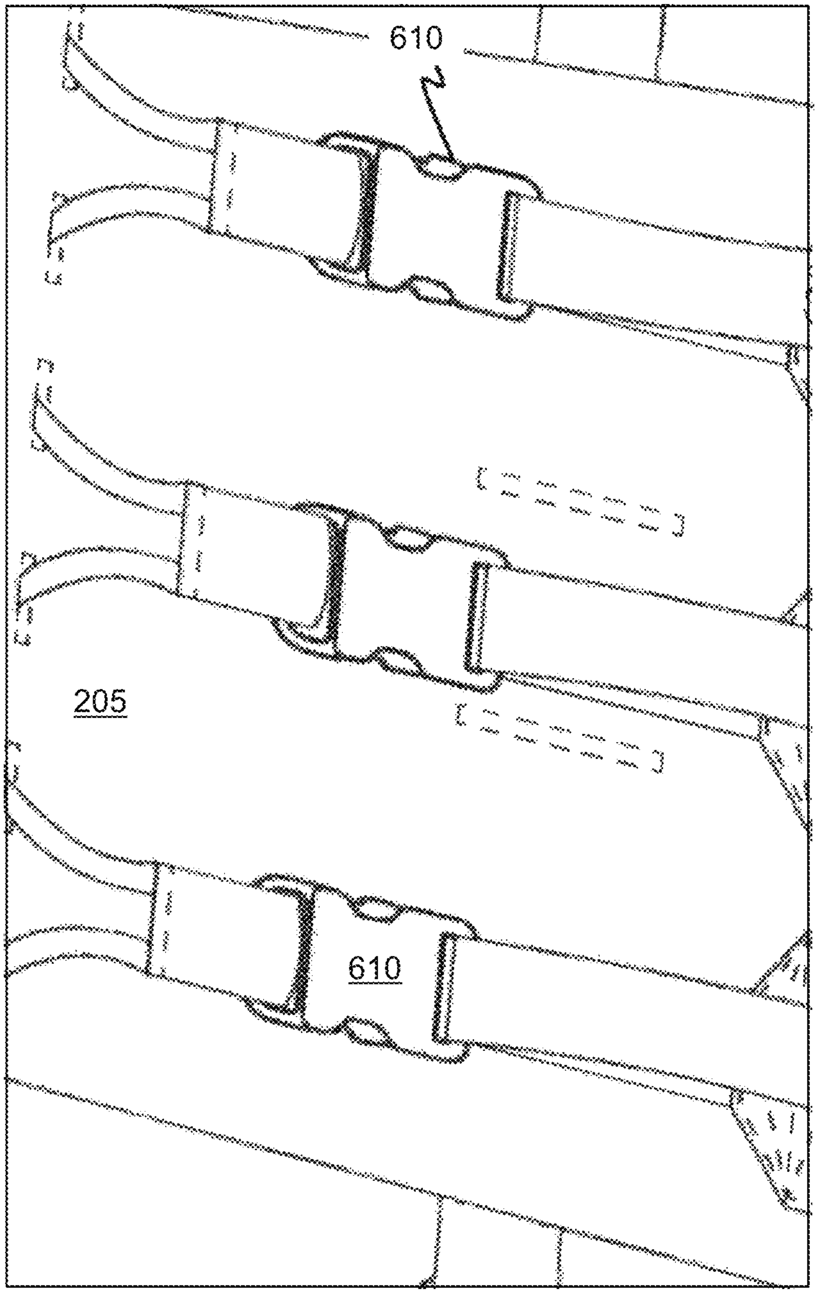
FIG. 14 is a photograph of the demountable fasteners coupled to the front panel, in accordance with certain embodiments.
Figure 15:
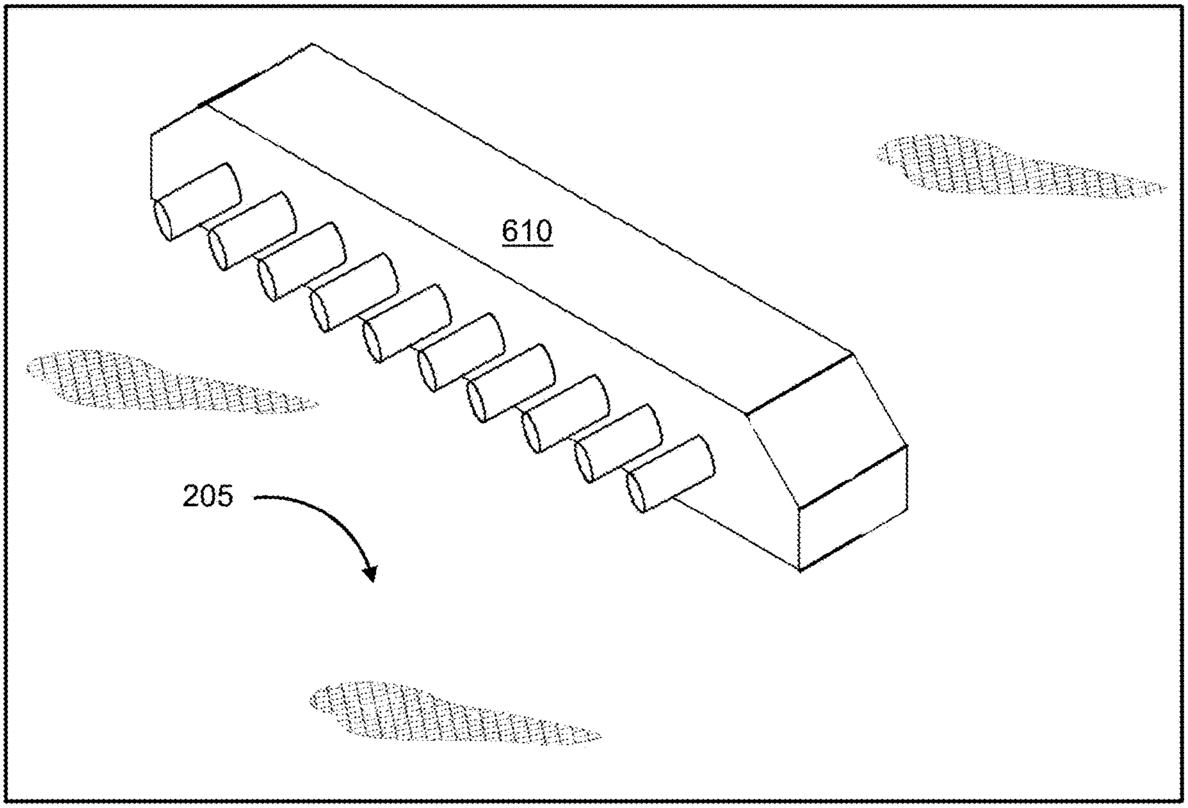
FIG. 15 is a photograph of the communications hub coupled to the front panel, in accordance with yet still other embodiments.

As depicted in FIGS. 2 and 7, each shoulder strap 210 includes loops 215 that receive a garment strap 710 (e.g., a backpack shoulder strap, a plate carrier shoulder strap, suspenders, a overalls shoulder strap, as well as similar shoulder straps) and thereby demountably and slidably couples the WCP 101 to the garment item. In other words, each loop 215 allows the garment strap 710 to demountably and slidably couple to the shoulder strap 210. Here, the loops 215 are oriented opposite the antenna attachment sites 130 (i.e., on opposing surfaces). In this manner, the WCP 101 is secured on top of the garment item having the garment shoulder straps 710. The back panel 205 includes the communications hub 105 affixed thereto and oriented towards the front panel 200 when in the "first closed state".

Figure 6:
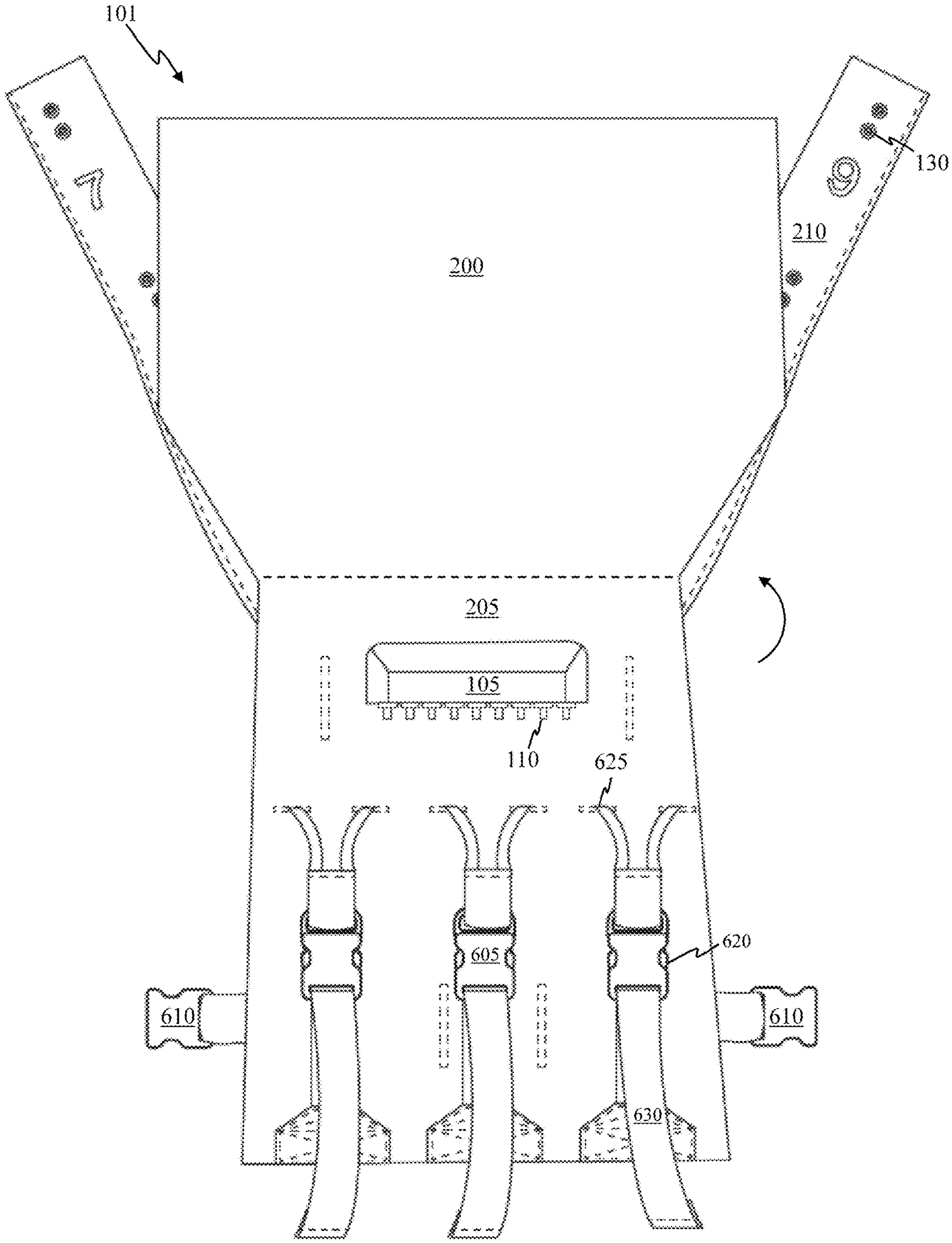
FIG. 6 illustrates the WCP in first "first open state" thereby exposing a communications hub and demountable fasteners, in accordance with certain embodiments.

FIG. 6 illustrates the WCP 101 is oriented in a "first open state" that exposes the communications hub 105 and first demountable fasteners 605, in accordance with certain embodiments. In the "first open state", the front panel 200 is positioned distal to (i.e., pivoted away from) the back panel 205 and thereby exposes the communications hub 105 and the demountable fastener 605. In preferred embodiments, the front panel 200 includes a first portion 1605 and a second portion 1610 that is pivotably attached to the first portion 1605. The second portion 1610 is positioned proximate to the back panel 205. The second portion 1610 includes at least one second antenna attachment site 130 positioned and oriented opposite the back panel 205. Each of the second antenna attachment sites 130 can receive a demountable antenna element 135.

Figure 16:
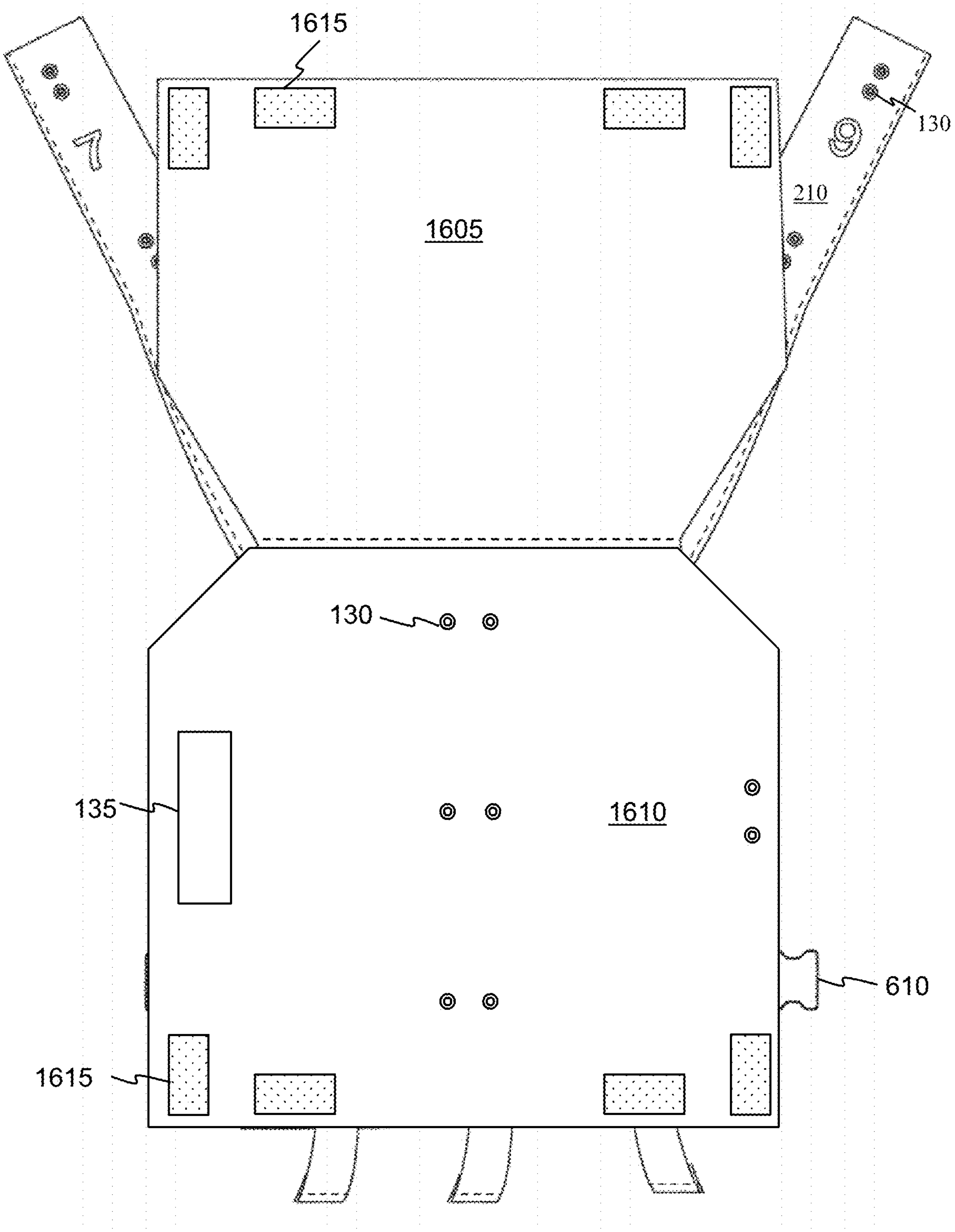
FIG. 16 is a photograph of a front view of the WCP in a "second open state" exposing antenna attachment sites and a demountable antenna element demountably attached to one of the antenna attachment sites, in accordance with some embodiments.
Figure 17:
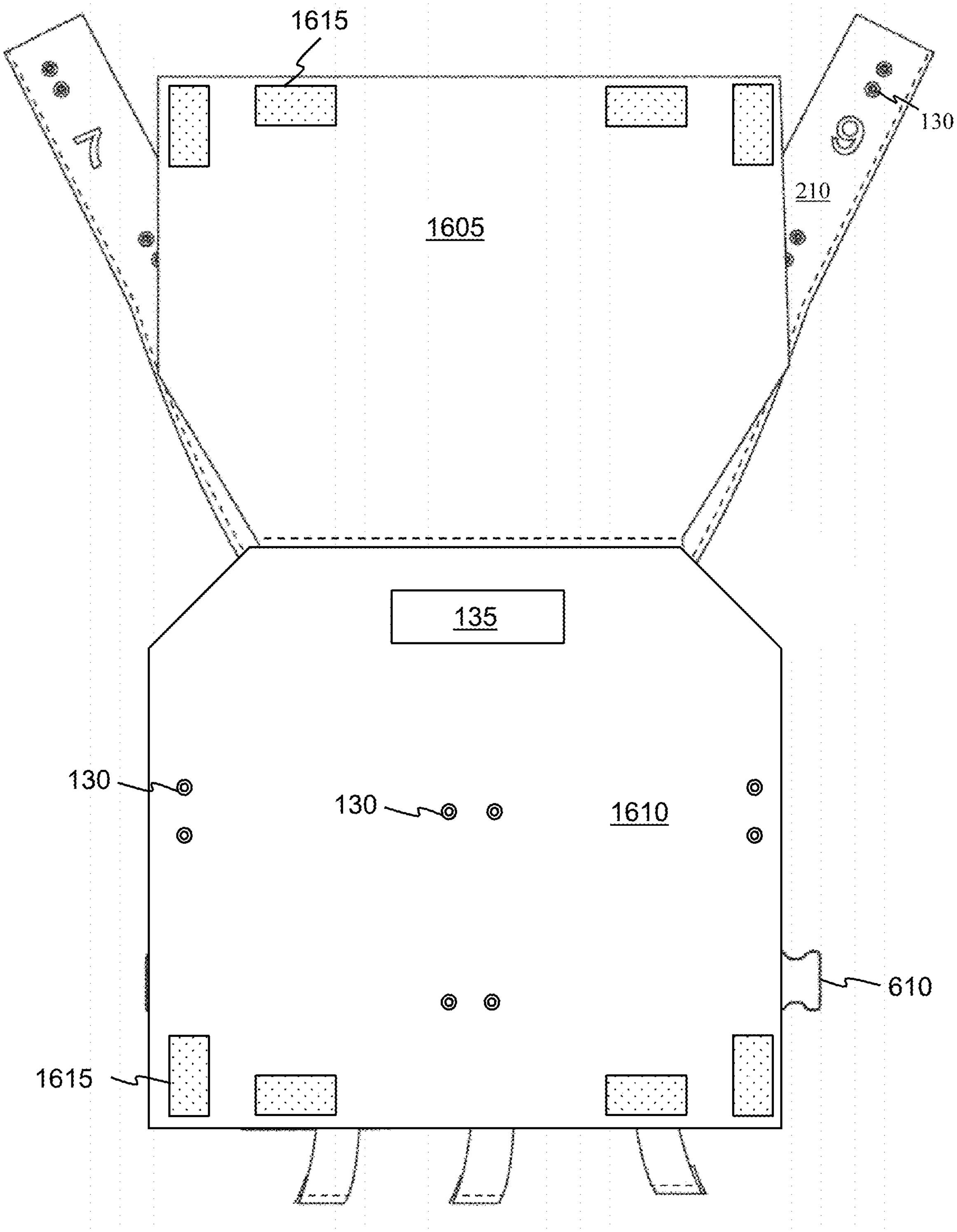
FIG. 17 is a photograph of a front view of the WCP in a "second open state" having a demountable antenna element demountably attached to an alternative antenna attachment site compared to FIG. 16, in accordance with some embodiments.
Figure 18:
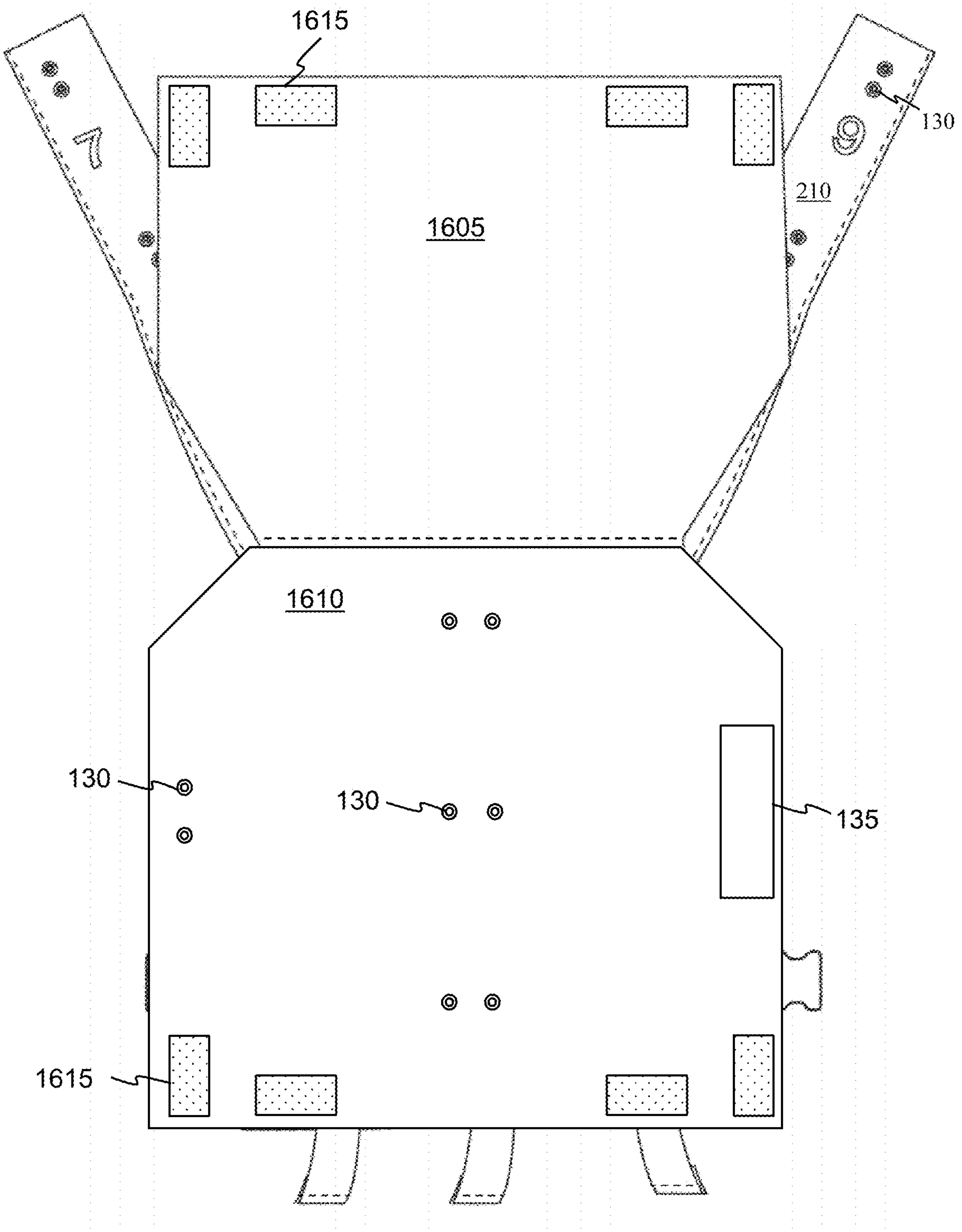
FIG. 18 is a photograph of a front view of the WCP in a "second open state" having a demountable antenna element demountably attached to an alternative antenna attachment site compared to FIGS. 16 and 17, in accordance with some embodiments.
Figure 19:
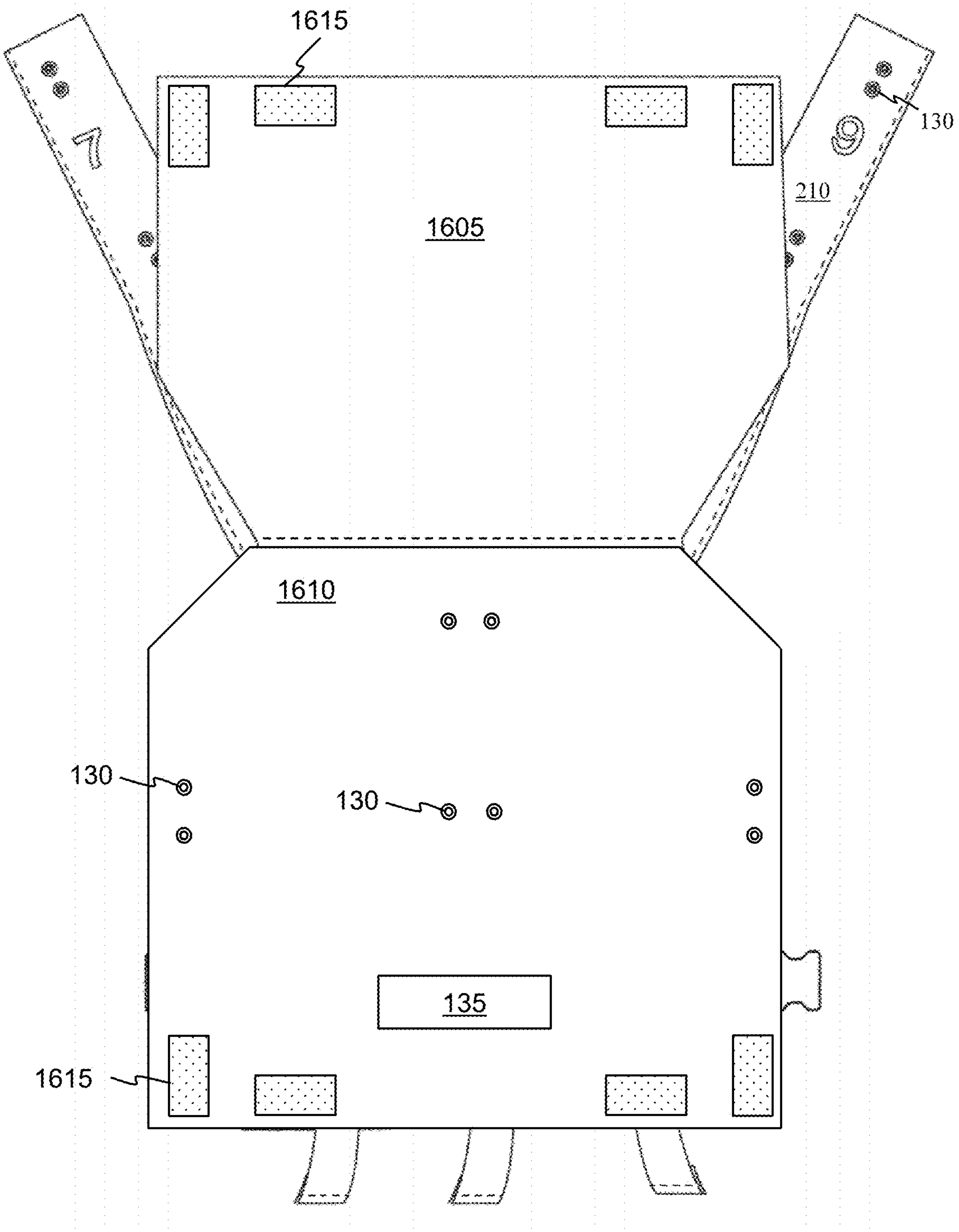
FIG. 19 is a photograph of a front view of the WCP in a "second open state" having a demountable antenna element demountably attached to an alternative antenna attachment site compared to FIG. 16-18, in accordance with some embodiments.
Figure 20:
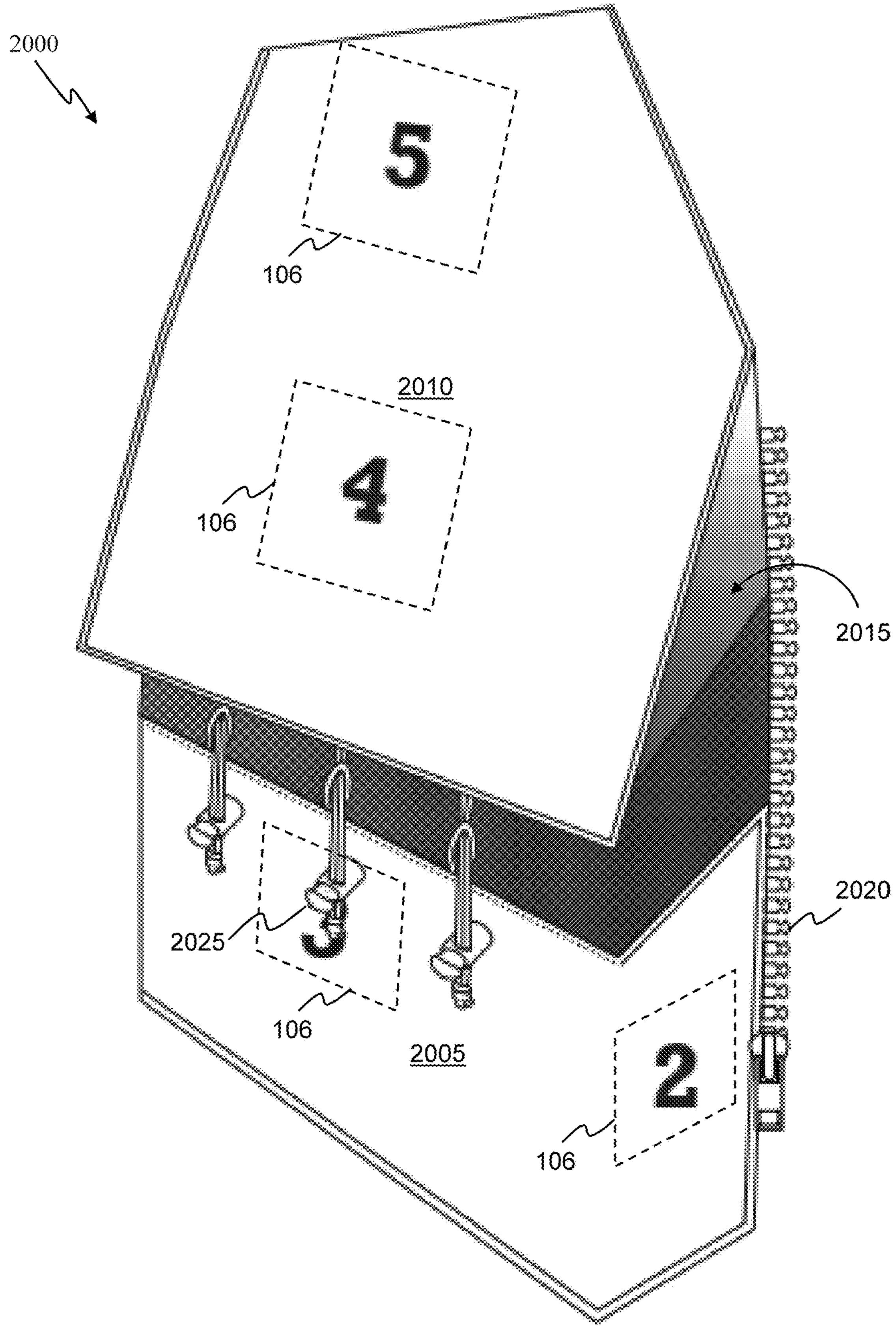
FIG. 20 illustrates a perspective view of a WCP in a "closed state", in accordance with other embodiments.
Figure 21:
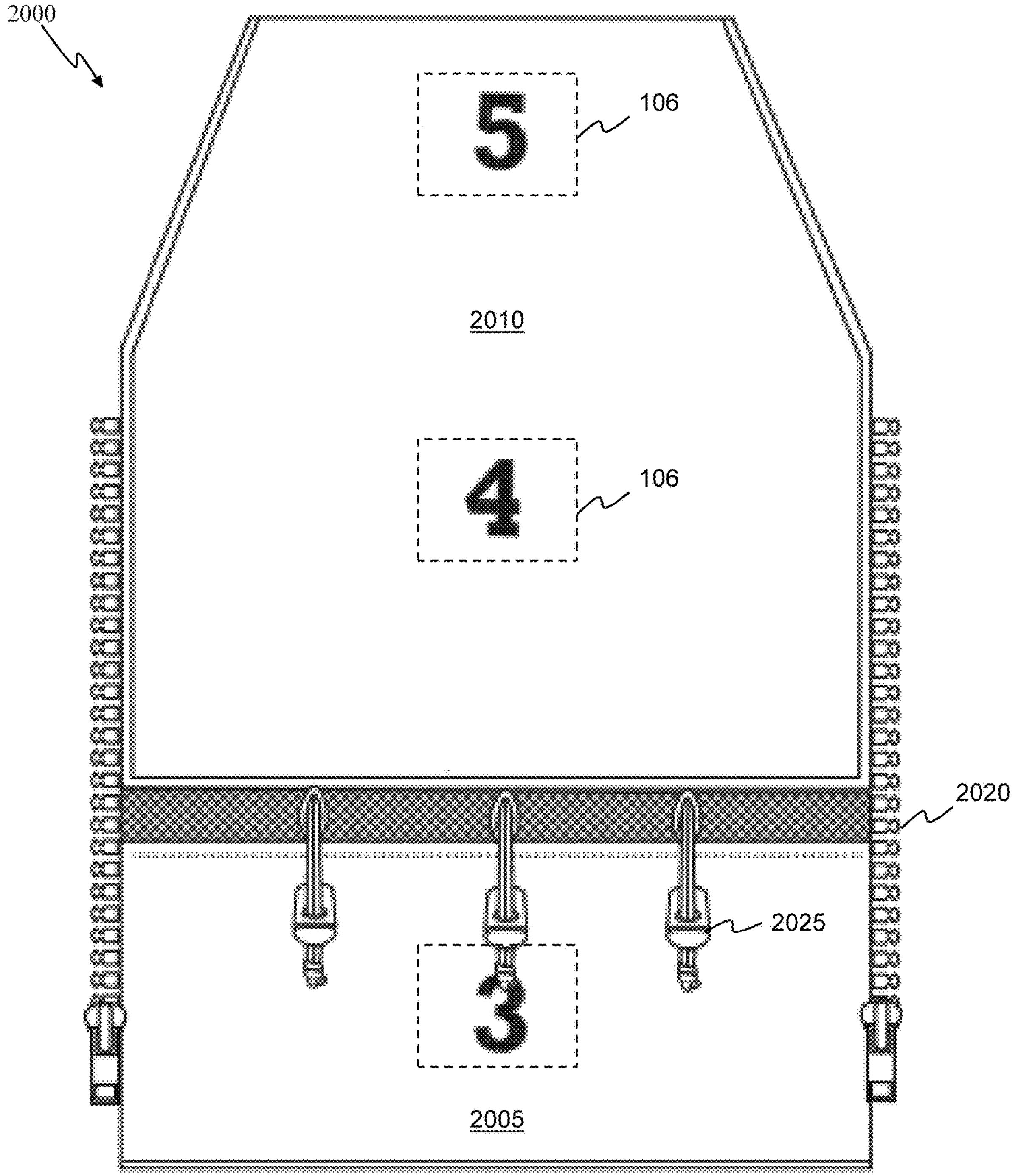
FIG. 21 illustrates a front view of the WCP of FIG. 20 in the "closed state", in accordance with certain embodiments.

The demountable antenna element 135 is preferably fabricated using the conductive composition (other conductive compositions may be utilized). The first portion 1605 and the second portion 1610 are demountably coupled together via a plurality of fourth demountable fasteners 1615. Although the fourth demountable fasteners 1615 are depicted as hook-and-loop fasteners (i.e., Velcro), the components can be any demountable fastener known in the art that facilitates one or more embodiments of the instant disclosure. Although, the plurality of fourth demountable fasteners 1615 are depicted as being peripherally positioned on the first portion 1605 and the second portion 1610, the components can have any positioning that supports one or more embodiments of the instant disclosure. FIG. 16 is a photograph of a front view of the WCP 101 oriented in a "second open state" exposing the antenna attachment sites 130 and a demountable antenna element 135 demountably attached to one of the antenna attachment sites 130, in accordance with some embodiments. Here, the first portion 1605 is positioned distal to the second portion 1610 in "the second open state" and thereby exposes the antenna attachment site 130. In a "second closed state," the first portion 1605 is positioned proximate to the second portion 1610 and thereby covers the antenna attachment sites 130 positioned on the second portion 1610. In other words, in the "second closed state," the first portion 1605 is demountably affixed to the second portion 1610 via the fourth demountable fasteners 1615 and thereby covers the antenna attachment sites 130.

Although FIG. 6 depicts the back panel 205 as having a plurality of first demountable fasteners 605 positioned proximate to the communications hub 105, the first demountable fasteners 605 can have any positioning relative to the communications hub 105 to satisfy one or more embodiments of the instant disclosure. The first demountable fasteners 605 are preferably placed proximate to the communications hub 105 to limit the length of RF cable necessary to connect the portable radio to the communications hub 105. To be sure, the back panel 205 can have any number of first demountable fasteners 605 to satisfy an embodiment of the instant disclosure. Each first demountable fastener 605 preferably secures a portable radio (e.g., the communications devices 115, 120, and/or 125) to the back panel 205. The first demountable fasteners 605 can be any demountable fastener or combination of demountable fasteners known in the art that demountably secures the portable radio to the back panel 205. The first demountable fasteners 605 are preferably oriented towards the front panel 200 (i.e., oriented opposite the user). Hence, the "first closed state," the demountable fasteners 605 are positioned proximate to the front panel 200. Applicable demountable fasteners include, but are not limited to, buckles, clasps, Velcro, snap fastener, snap-fittings, straps, zippers, and similar demountable fasteners).

In preferred embodiments, the first demountable fastener 605 includes a buckle 620 affixed to an elastic cord 625 at one end and a strap 630 at the opposite end to allow the first demountable fastener 605 to adjust to and secure portable radios of any size. For example, the first demountable fastener 605 vertically orients the portable radios. In other embodiments, the first demountable 605 horizontally orients the portable radios. In certain embodiments, the front panel 200 includes antenna attachment sites 130 (discussed below) to receive demountable antenna elements 135. FIGS. 8-19 are photographs of the WCP 101, in accordance with yet still other embodiments. Here, the WCP 101 is depicted in the "first open state," the "second open state," the "first closed state," and the "second closed state." The WCP 101 is also shown with a demountable antenna element 135 affixed at various positions to one of the antenna attachment sites 130 positioned thereon.

In preferred embodiments, the antenna elements 106 and the demountable antenna elements 135 are applied (e.g., screen printing, coating, similar application methods) on a substrate (e.g., polyethylene terephthalate and similar materials) using a graphene polymer-based composition ("conductive composition") wherein individual fully exfoliated sheets of graphene ("graphene sheets") are mixed and dispursed throughout the polymer matrix. In some embodiments, the antenna elements 106 are applied (e.g., printed) on a surface of the WCP 101, which acts the substrate. The graphene sheets are approximately 1 nm or less thick and have a "platey" (e.g., two-dimensional) structure. To be sure, although graphene sheets, graphite, and carbon nanotubes are allotropes of carbon, they are not identical in structure or composition and each exhibits mutually exclusive properties.

The antenna elements 106 and the detachable antenna element 135 each have a reduced visual signature (e.g., less than 2 mm thick) to address identification and entanglement issues associated with traditional antenna elements (e.g., whip antennas). Here, the aforementioned antenna elements extend no more than 2 mm from the surface of the WCP 100 and have a reduced probability of entanglement with structures external to the WCP 100. In other embodiments, the aforementioned antenna elements exhibit a gain greater than 0 dB. The detachable antenna element 135 are preferably positioned at various locations on the WCP 100 to achieve an omnidirectional RF radiation pattern that body worn antennas known in the art cannot achieve (such as the radio mounted whip antenna). As depicted in FIG. 7C, a transmission line 750 can be embedded in the WCP 100 in a manner that reduces its ability to interfere with user movements. For example, the transmission lines 750 can be embedded between two substrate layers inaccessible to the user of the WCP 100. The transmission line 750 is preferably flexible to substantially conform to the contours of the user. The transmission line 750 can be fabricated using the conductive composition.

The conductive composition preferably includes one or more polymers and fully exfoliated single sheets of graphene that form a three dimensional percolated network within the polymer matrix and have nanoscale separation between the individual graphene sheets. In other embodiments, the antenna elements are printed using other polymer-based conductive inks that contain metals (e.g., silver, copper, gold, nickel, other metals, or a combination of two or more thereof). An increase in resistance results in a decrease in antenna element performance efficiency. As used herein, "antenna efficiency" is defined as the ratio of power delivered to antenna elements versus the power radiated therefrom. Hence, an increase in electrical resistance decreases the amount of power available for radiation, which thereby decreases antenna element performance efficiency.

FIGS. 20-24 illustrate various views of a WCP 2000, in accordance with certain embodiments. The WCP 2000 shares one or more components, aspects, and/or functionalities with the WCP 100 and/or the WCP 201. Here, the WCP 2000 includes a back panel 2200, a main body 2005, a cover 2010, and a communications hub. The main body 2005 is affixed to the back panel 2200. The cover 2010 is pivotably affixed to the back panel opposite the main body 2005. The main body 2005 and the cover 2010 share the same orientation relative to the back panel 2200. The cover 2010 includes the communications hub 105, similar to the WCP 101 and the WCP 2000. The communications hub 105 includes an antenna port 110. The main body 2005 and the back panel 2200 together form an opening 2015 that is oriented towards the cover 2010. The main body 2005 receives a portable radio (e.g., the communications device 115, 120, 125, or a combination of two or more thereof) via the opening 2015. The cover 2010 and the main body 2005 each include an antenna element 106 (discussed above) embedded therein.

As previously discussed, the antenna element 106 is conductively coupled to the antenna port 110. In the instant embodiment, the WCP 2000 can be oriented in a "first open state" or a "first closed state." In the "first open state," the cover 2010 is positioned distal (i.e., pivoted away from) to the opening 2015 and thereby exposes the opening 2015. In the "first closed state," the cover 2010 is positioned proximate to and on top of the opening 2015. In preferred embodiments, the cover 2010 includes a first portion 2405, a second portion 2305, and a third portion 2310. The first portion 2405, the second portion 2305, and the third portion 2310 are each rotatably affixed to the back panel 2200. The third portion 2310 is positioned between the first portion 2405 and the second portion 2305. Although the first portion 2405 is preferably positioned above the second portion 2305 and the third portion 2310, these components can have any positioning that supports an embodiment of the instant disclosure.

Figure 23:
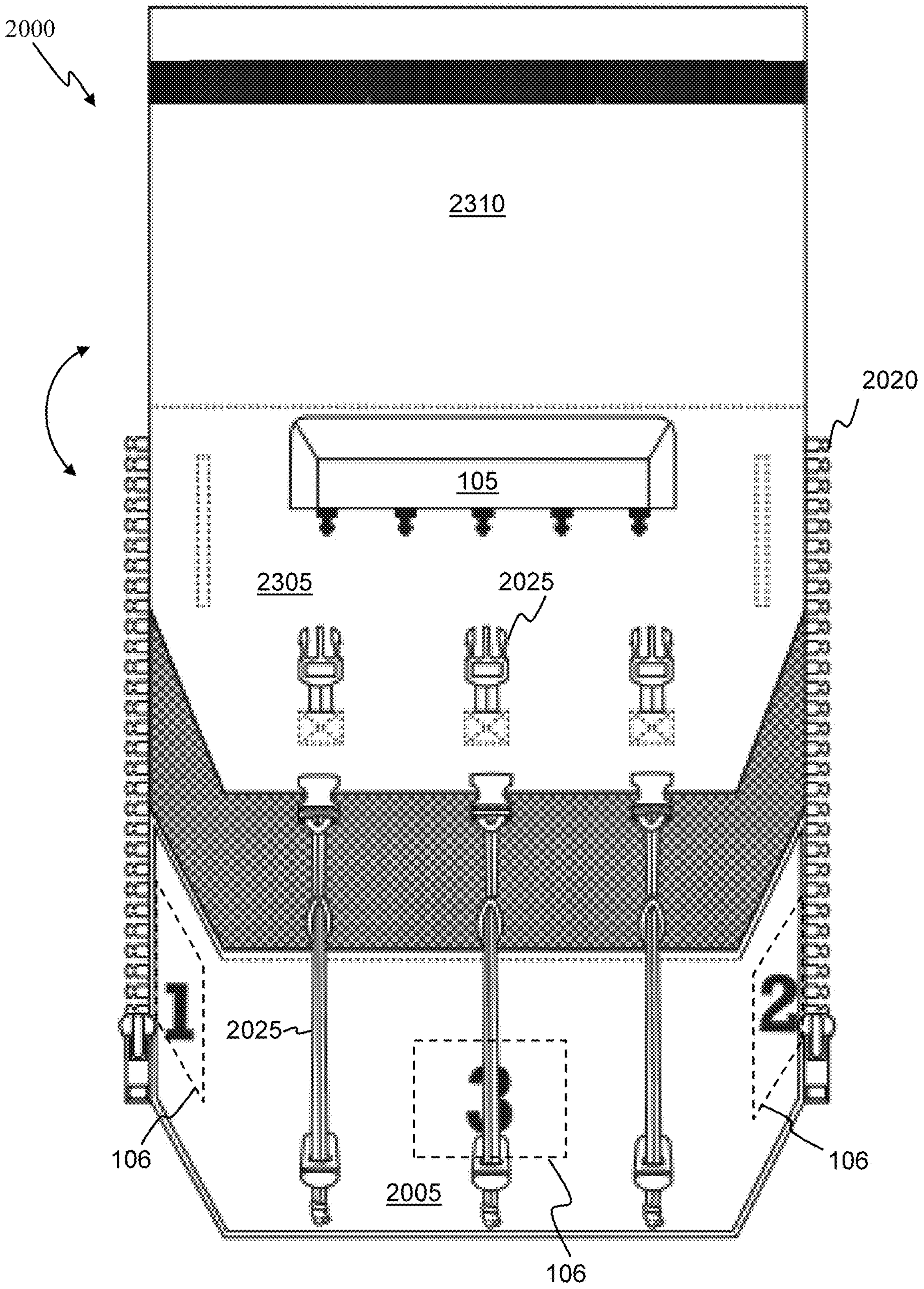
FIG. 23 illustrates a front view of the WCP of FIG. 20 in a "first open state" exposing the communications hub, in accordance with some embodiments.

The second portion 2305 preferably includes the communications hub 105, which allows the third portion 2310 and the first portion 2405 to selectively cover and protect the communications hub 105. The first portion 2405, which is the exposed layer of the cover 2010, includes the antenna element 106 (e.g., embedded therein). As illustrated in FIG. 23, the WCP 2000 can be oriented a "second open state" and a "second closed state." In the "second open state," the third portion is pivoted away from the second portion 2305 thereby exposing the communication hub 105. Similarly, in the "second closed state," the third portion 2310 is positioned proximate to and on top of the second portion 2305. The communication functionality of this version of the WCP 2000 can be modified.

Figure 22:
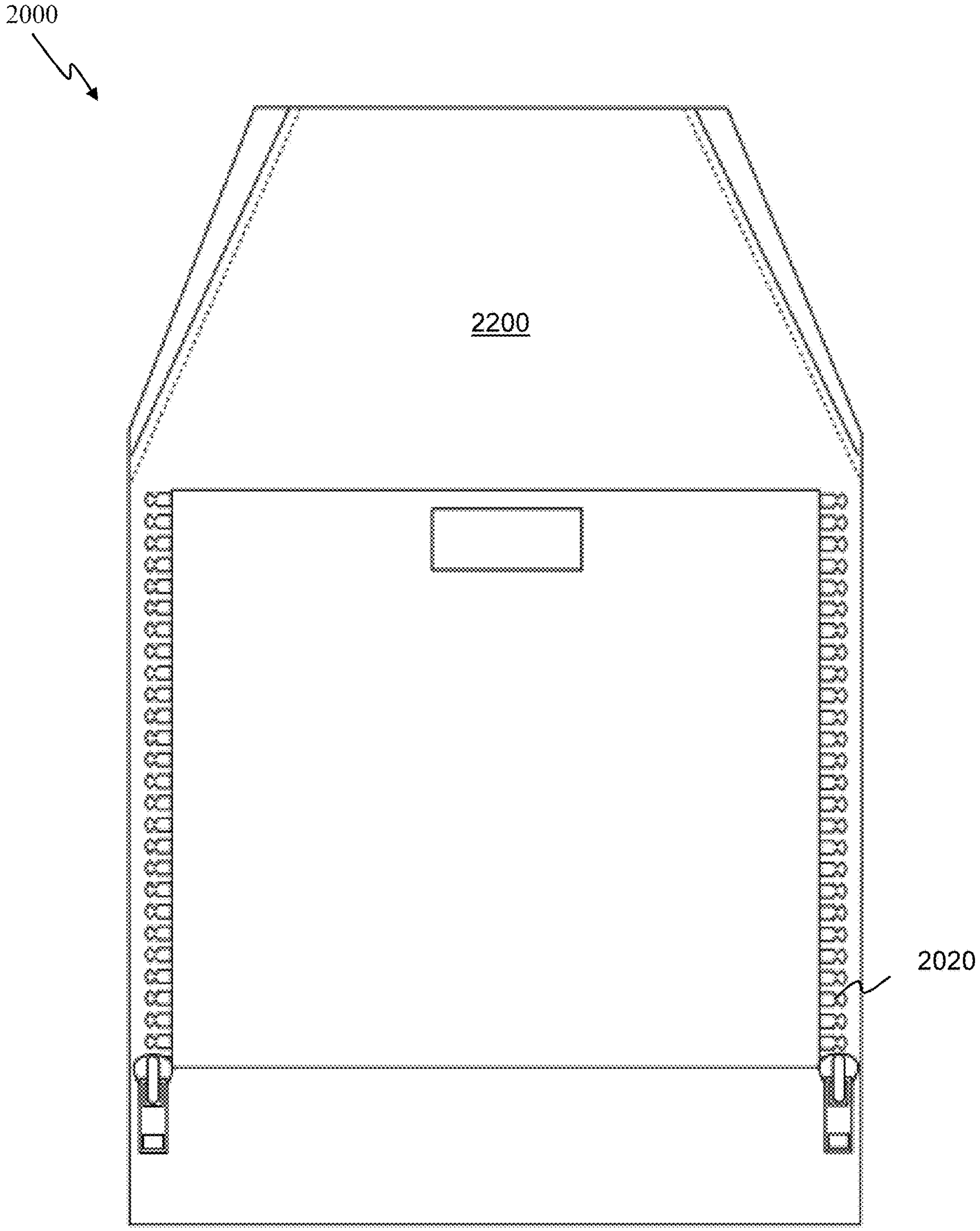
FIG. 22 illustrates a rear view of the WCP of FIG. 20 in the "closed state", in accordance with yet still other embodiments.

For example, the third portion 2310 includes at least one antenna attachment site 130, which is oriented away from the communications hub 105 when the third portion 2310 is positioned on and proximate to the second portion 2305 (i.e., when the WCP 2000 is oriented in the "second closed state"). The antenna attachment site 130 is affixed to the top of the third portion 2310. Each antenna attachment site 130 receives a demountable antenna element 135 and coupled together as discussed above. The WCP 2000 also includes a first demountable fastener 2025 that demountably couple the main body 2005 and the cover 2010 together and thereby secures the contents (e.g., portable radios) of the main body 2005. For example, the first demountable fastener 2025 shares one or more aspects of the first demountable fastener 605 (discussed above). As depicted in FIG. 22, the WCP 2000 preferably includes a third demountable fastener 2020 affixed to the back panel 2200 opposite the cover 2010 and the main body 2005 (i.e., on opposing surfaces).

The third demountable fastener 2020 demountably affixes the WCP 2000 to a garment item (discussed above) via a complementary structure(s) affixed to the garment item. Although the third demountable fastener 2020 is illustrated as being laterally affixed on the back panel 2200, the component can have any orientation and/or positioning that will facilitate an embodiment of the instant disclosure. The third demountable fastener 2020 shares one or more aspects, functions, components with the second demountable fastener 220. The WCP 2000 can further include a second demountable fastener 2415 that demountably couples the first portion 2405 and the third portion 2310 together and thereby secures and/or protects the demountable antenna elements 135 affixed to the third portion 2310. Although the second demountably fastener 2415 are preferably hook-and-loop (i.e., Velcro) fasteners, they can be any demountable fastener known in the art (e.g., snap fasteners) that facilitate an embodiment of the instant disclosure.

Figure 24:
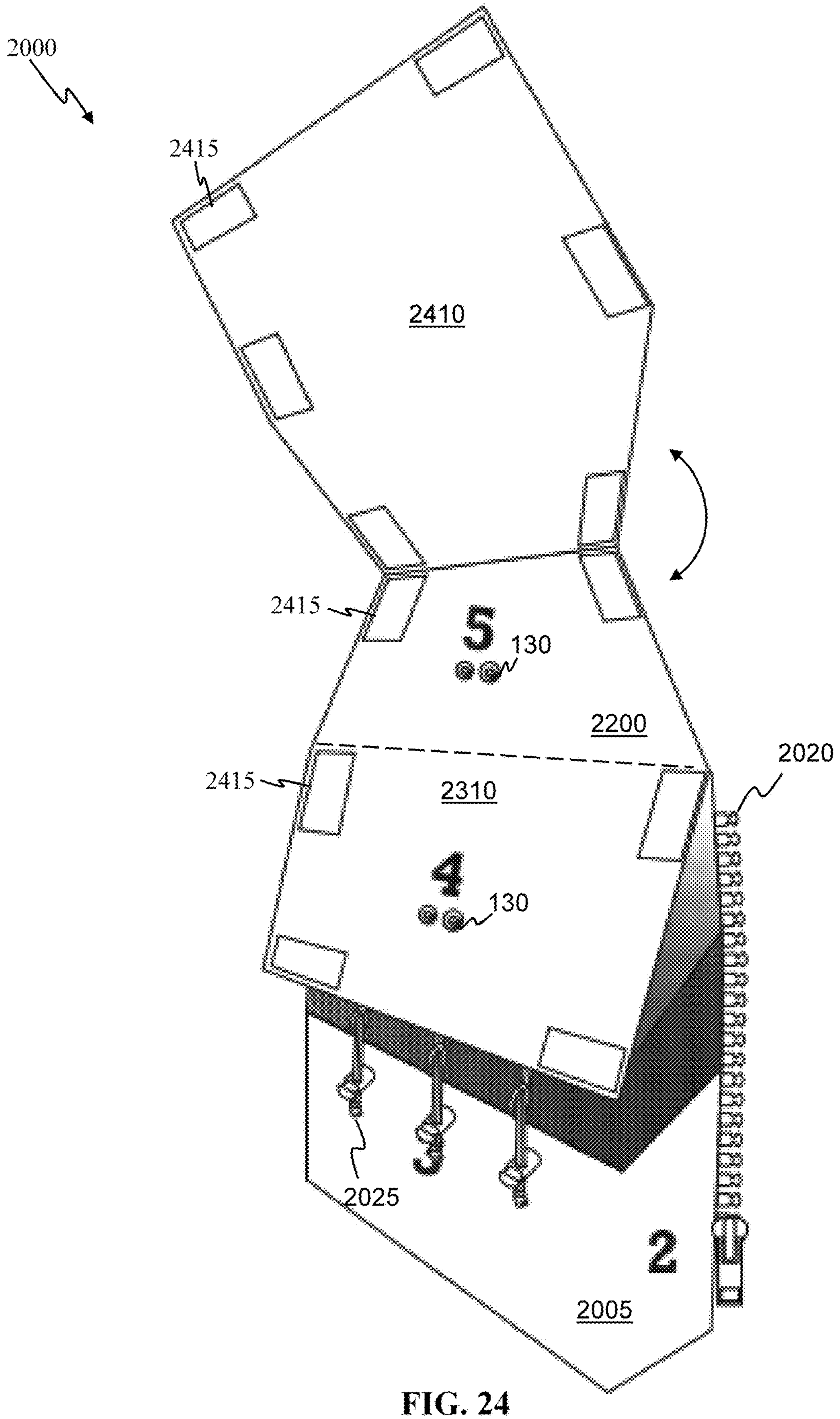
FIG. 24 illustrates a perspective view of the WCP of FIG. 20 in a "second open state" exposing a third portion and antenna attachment sites, in accordance with certain embodiments.
Figure 25:
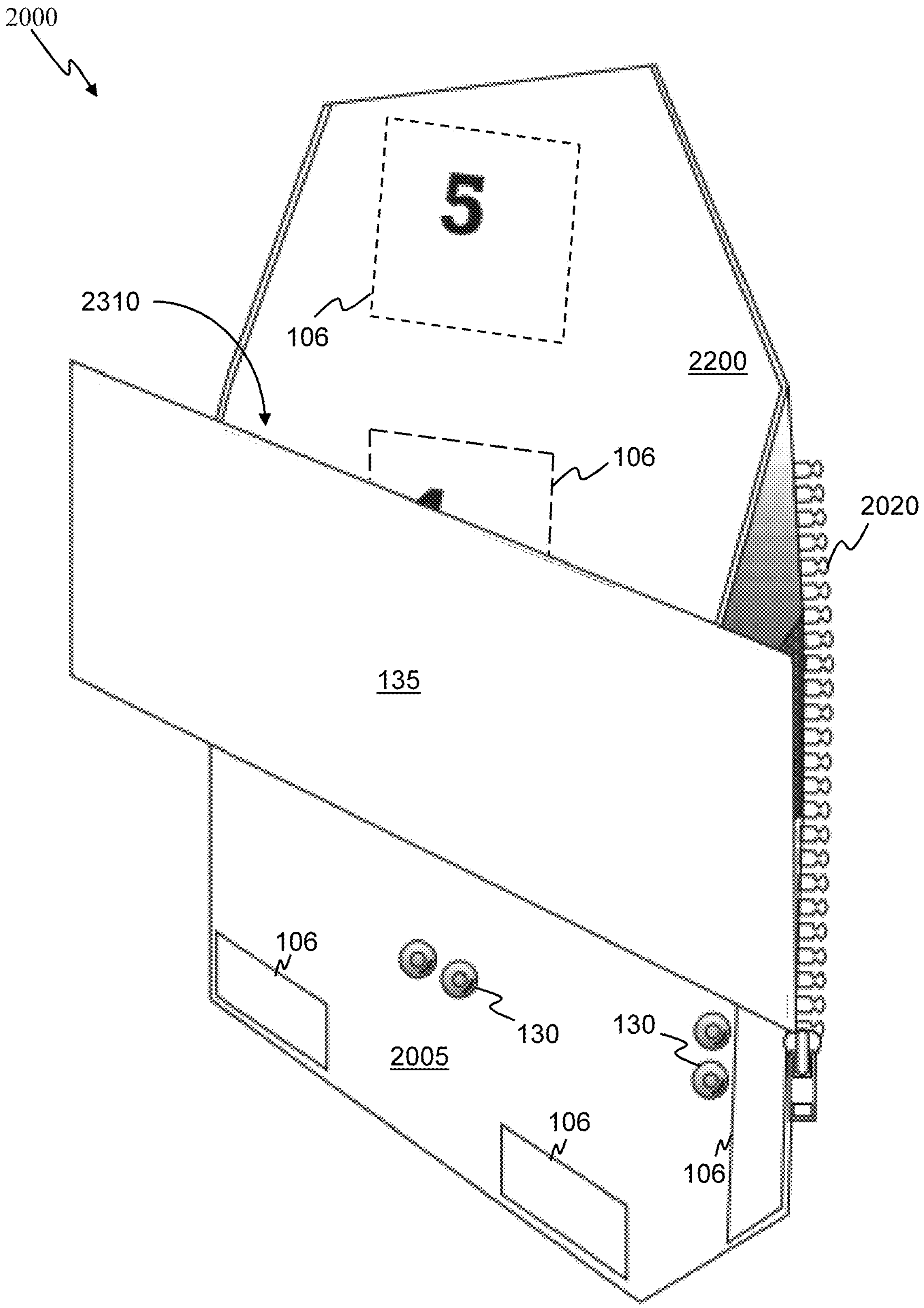
FIG. 25 illustrates the WCP of FIG. 24 having a demountable antenna element demountably affixed to an antenna attachment site positioned on a third portion of the WCP, in accordance with other embodiments.

FIG. 25 illustrates the WCP 2000 of FIG. 24 having a demountable antenna element 135 demountably affixed to an antenna attachment site 130 positioned on the third portion of the WCP 2000, in accordance with other embodiments. Here, the demountable antenna element 135 is depicted as having a larger area compared to other embodiments, which allows for the inclusion of larger sized antenna elements (e.g., high frequency antenna elements) and/or antenna arrays. In some aspects, at least one antenna attachment site 130 is externally affixed to the first portion 2005 (e.g., centrally and/or laterally located). Copies of the antenna elements 106 are peripherally affixed on the first portion 2005 and laterally affixed to the sides of the first portion 2005. To be sure, the first portion 2005 can include any number of the antenna attachment sites 130 and the antenna elements 106 positioned in any configuration that satisfy one or more embodiments of the instant disclosure.

As various modifications could be made in the constructions and methods herein described and illustrated without departing from the scope of the invention, it is intended that all matter contained in the foregoing description or shown in the accompanying drawings shall be interpreted as illustrative rather than limiting. Thus the breadth and scope of the instant disclosure should not be limited by any of the above-described exemplary embodiments, but should be defined only in accordance with the following claims appended hereto and their equivalents.

What is claimed is:

1. A wearable communications pouch ("WCP") comprising:
- a front panel;
- a back panel;
- a shoulder strap;
- a first closed state;
- an first open state
- wherein
  - the front panel comprises an antenna element;
  - the back panel is pivotably coupled to the front panel;
  - the shoulder strap is pivotably coupled to and extends from the back panel;
  - the back panel comprises a communications hub affixed thereto;
  - the communications hub comprises antenna ports;
  - each antenna element is conductively coupled to an antenna port;
  - each shoulder strap receives a garment strap and thereby demountably couples the WCP to the garment;
  - each antenna port demountably and conductively couples to a portable radio;
  - in the first closed state,
    - the front panel is positioned proximate to the back panel and thereby covers the communications hub;
    - the communications hub is oriented towards the first panel; and
  - in the first open state, the front panel is pivoted away from the back panel and thereby exposes the communications hub.

2. The wearable communications pouch of claim 1, wherein
- the antenna element comprises a conductive composition;
- the conductive composition comprises a polymer and fully exfoliated single sheets of graphene; and
- the graphene sheets are present in the polymer as a three-dimensional percolated network.

3. The wearable communications pouch of claim 2, wherein
- the back panel comprises a plurality of first demountable fasteners positioned proximate to the communications hub; and
- each first demountable fastener receives and secures a portable radio.

4. The wearable communications pouch of claim 3, wherein
- the shoulder strap comprises a loop that receives the garment strap; and
- when positioned within the loop, the garment strap is demountably and slidably coupled to the shoulder strap.

5. The wearable communications pouch of claim 4, wherein
- the shoulder strap comprises a first antenna attachment site;
- the antenna attachment site
  - is conductively coupled to one of the antenna ports;
  - demountably couples to a first demountable antenna element; and
- the first demountable antenna element comprises the conductive composition.

6. The wearable communications pouch of claim 5, further comprising:
- a plurality of second demountable fasteners; and
- the front panel and back panel are laterally and demountably coupled together via the second demountable fasteners.

7. The wearable communications pouch of claim 6, wherein
- the front panel comprises:
  - a first portion;
  - a second portion;
- wherein
  - the first portion and the second portion are each pivotably attached to the back panel
  - the second portion
    - is positioned proximate to the back panel;
    - comprises a second antenna attachment site;

when in the first closed state, the second antenna attachment site is positioned opposite the back panel;

the second antenna attachment site demountably couples to a second demountable antenna element;

the second antenna attachment site is conductively coupled to an antenna port; and the second demountable antenna element comprises the conductive composition.

8. The wearable communications pouch of claim 7, further comprising:

a second open state;

a second closed state;

wherein in the second closed state, the second antenna attachment site is oriented towards and positioned proximate to the first portion;

the first portion is positioned proximate to the second portion and thereby covers the second antenna attachment site; and in the second open state, the first portion is pivoted away from the second portion and thereby exposes the second antenna attachment site.

9. The wearable communications pouch of claim 8, wherein the back panel comprises a third demountable fastener externally affixed thereto;

the third demountable fastener is vertically positioned and externally affixed thereto; and the third demountable fastener is positioned opposite the communications hub and demountably couples to the garment.

10. The wearable communications pouch of claim 9, wherein the first portion and the second portion are demountably coupled together via a plurality of fourth demountable fasteners; and the plurality of fourth demountable fasteners are peripherally positioned along the first portion and the second portion.

11. The wearable communications pouch of claim 10, wherein the first demountable antenna element comprises a pairing element; and the pairing element and the first antenna attachment site demountably engage each other when shifted in a common plane, which thereby forms a selective, intermitting, and conductive coupling therebetween.

12. The wearable communications pouch of claim 11, wherein at least one of the front panel, the back panel, and the shoulder strap comprise a radio-frequency ("RF") shielding material that is positioned proximate to the antenna element or the antenna attachment site in a manner to reflect RF radiation that emanates from the antenna element or the antenna attachment site away from users of the communications pouch when worn; and the RF shielding material comprises one or more of a textile, a mesh, a coating, and a foam.

13. A wearable communications pouch ("WCP") comprising:

a front panel;

a back panel;

a shoulder strap;

a first closed state;

an first open state wherein the front panel comprises an antenna elements;

the back panel is pivotably coupled to the front panel;

the shoulder strap is pivotably coupled to and extends from the back panel;

the back panel comprises a communications hub affixed thereto;

the communications hub comprises antenna ports;

each antenna element is conductively coupled to an antenna port;

each shoulder strap receives a garment strap and thereby demountably couples the WCP to the garment;

each antenna port demountably and conductively couples to a portable radio;

in the first closed state, the front panel is positioned proximate to the back panel and thereby covers the communications hub;

the communications hub is oriented towards the first panel;

in the first open state, the front panel is pivoted away from the back panel and thereby exposes the communications hub;

the antenna element comprises a conductive composition;

the conductive composition comprises a polymer and fully exfoliated single sheets of graphene; and the graphene sheets are present in the polymer as a three-dimensional percolated network.

14. The wearable communications pouch of claim 13, wherein the back panel comprises a plurality of first demountable fasteners positioned proximate to the communications hub; and each first demountable fastener receives and secures a portable radio.

15. The wearable communications pouch of claim 13, wherein the shoulder strap comprises a loop that receives the garment strap; and when positioned within the loop, the garment strap is demountably and slidably coupled to the shoulder strap.

16. The wearable communications pouch of claim 13, wherein the shoulder strap comprises a first antenna attachment site;

the antenna attachment site is conductively coupled to one of the antenna ports;

demountably couples to a first demountable antenna element; and the first demountable antenna element comprises the conductive composition.

17. The wearable communications pouch of claim 16, wherein the first demountable antenna element comprises a pairing element; and the pairing element and the first antenna attachment site demountably engage each other when shifted in a common plane, which thereby forms a selective, intermitting, and conductive coupling therebetween.

18. The wearable communications pouch of claim 13, wherein the front panel comprises:

a first portion;

a second portion;

wherein the first portion and the second portion are each pivotably attached to the back panel the second portion is positioned proximate to the back panel;

comprises a second antenna attachment site;

when in the first closed state, the second antenna attachment site is positioned opposite the back panel;

the second antenna attachment site demountably couples to a second demountable antenna element;

the second antenna attachment site is conductively coupled to an antenna port; and the second demountable antenna element comprises the conductive composition.

19. The wearable communications pouch of claim 18, further comprising:

a second open state;

a second closed state;

wherein in the second closed state, the second antenna attachment site is oriented towards and positioned proximate to the first portion;

the first portion is positioned proximate to the second portion and thereby covers the second antenna attachment site; and in the second open state, the first portion is pivoted away from the second portion and thereby exposes the second antenna attachment site.

20. The wearable communications pouch of claim 13, wherein at least one of the front panel, the back panel, and the shoulder strap include a RF shielding material; and the RF shielding material comprises one or more of a textile, a mesh, a coating, and a foam.

* * * * *